(12) United States Patent
Kappers et al.

(10) Patent No.: US 12,540,495 B2
(45) Date of Patent: Feb. 3, 2026

(54) REFUSE VEHICLE WITH LOCKING TAILGATE

(71) Applicant: Oshkosh Corporation, Oshkosh, WI (US)

(72) Inventors: Jerrod Kappers, Oshkosh, WI (US); Vince Schad, Oshkosh, WI (US); Jacob Solberg, Oshkosh, WI (US); Troy Meyers, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 383 days.

(21) Appl. No.: 18/120,170

(22) Filed: Mar. 10, 2023

(65) Prior Publication Data

US 2023/0287715 A1    Sep. 14, 2023

Related U.S. Application Data

(60) Provisional application No. 63/436,184, filed on Dec. 30, 2022, provisional application No. 63/319,029, filed on Mar. 11, 2022.

(51) Int. Cl.
| | |
|---|---|
| *E05B 81/00* | (2014.01) |
| *B65F 3/24* | (2006.01) |
| *E05B 81/10* | (2014.01) |
| *E05B 81/18* | (2014.01) |
| *E05B 81/28* | (2014.01) |
| *E05B 81/66* | (2014.01) |
| *E05B 83/00* | (2014.01) |
| *E05B 85/22* | (2014.01) |
| *E05F 15/53* | (2015.01) |

(52) U.S. Cl.
CPC ............... *E05B 81/10* (2013.01); *B65F 3/24* (2013.01); *E05B 81/18* (2013.01); *E05B 81/28* (2013.01); *E05B 81/66* (2013.01); *E05B 83/00* (2013.01); *E05B 85/22* (2013.01); *E05F 15/53* (2015.01); *E05Y 2201/454* (2013.01); *E05Y 2400/40* (2013.01); *E05Y 2800/205* (2013.01); *E05Y 2900/518* (2013.01)

(58) Field of Classification Search
CPC ......... E05Y 2900/518; E05Y 2800/205; E05Y 2400/40; E05Y 2201/454; E05F 15/53; E05B 85/22; E05B 83/00; E05B 81/66; E05B 81/28; E05B 81/18; E05B 81/10
See application file for complete search history.

(56) References Cited

U.S. PATENT DOCUMENTS

| | | |
|---|---|---|
| 3,272,552 A | 9/1966 | Park |
| 4,307,541 A | 12/1981 | Farmer et al. |
| 4,361,985 A | 12/1982 | De Marco |
| (Continued) | | |

Primary Examiner — Steven O Douglas
(74) Attorney, Agent, or Firm — Foley & Lardner LLP

(57) ABSTRACT

A refuse vehicle includes a chassis, a body, a tailgate, a tailgate actuator, and a tailgate locking assembly. The body supports the chassis and defines a receptacle configured to store refuse therein. The tailgate is positioned at an end of the receptacle and is rotatably coupled to the body. The tailgate actuator coupled to the tailgate and is configured to move the tailgate relative to the body between an open position and a closed position. The tailgate locking assembly is coupled to the body and the tailgate actuator and is configured to couple the tailgate to the body in response to the movement of the tailgate actuator.

20 Claims, 21 Drawing Sheets

(56) References Cited

U.S. PATENT DOCUMENTS

| | | | |
|---|---|---|---|
| 4,665,649 A | 5/1987 | Hund | |
| 5,335,958 A | 8/1994 | Christenson et al. | |
| 5,816,766 A | 10/1998 | Clark | |
| 9,387,985 B2 * | 7/2016 | Gillmore | B65F 3/00 |
| 11,878,861 B2 * | 1/2024 | Rocholl | B65F 3/06 |
| 2017/0036628 A1 | 2/2017 | Nelson et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0347659 A1 * | 11/2020 | Rocholl | B60P 1/50 |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0324880 A1 | 10/2021 | Wente et al. | |
| 2021/0325529 A1 | 10/2021 | Koga et al. | |
| 2021/0325911 A1 | 10/2021 | Koga et al. | |
| 2021/0326550 A1 | 10/2021 | Kappers et al. | |
| 2021/0327164 A1 | 10/2021 | Koga et al. | |
| 2021/0327170 A1 | 10/2021 | Rocholl et al. | |
| 2021/0327237 A1 | 10/2021 | Rocholl et al. | |
| 2021/0339648 A1 | 11/2021 | Koga et al. | |
| 2021/0345062 A1 | 11/2021 | Koga et al. | |
| 2021/0373560 A1 | 12/2021 | Koga et al. | |
| 2022/0033181 A1 | 2/2022 | Koga et al. | |
| 2022/0096884 A1 | 3/2022 | Koga et al. | |
| 2022/0097527 A1 | 3/2022 | Koga et al. | |
| 2022/0097555 A1 | 3/2022 | Koga et al. | |
| 2022/0097556 A1 | 3/2022 | Koga et al. | |
| 2022/0097633 A1 | 3/2022 | Koga et al. | |
| 2022/0097961 A1 | 3/2022 | Koga et al. | |
| 2022/0097962 A1 | 3/2022 | Koga et al. | |
| 2022/0097963 A1 | 3/2022 | Koga et al. | |
| 2022/0097964 A1 | 3/2022 | Koga et al. | |
| 2022/0099723 A1 | 3/2022 | Koga et al. | |
| 2022/0106114 A1 | 4/2022 | Buege et al. | |
| 2022/0106115 A1 | 4/2022 | Buege et al. | |
| 2022/0156474 A1 | 5/2022 | Kappers et al. | |
| 2022/0161854 A1 | 5/2022 | Mortenson et al. | |
| 2022/0161997 A1 | 5/2022 | Mortenson et al. | |
| 2022/0185582 A1 | 6/2022 | Koga et al. | |
| 2022/0219896 A1 | 7/2022 | Gary et al. | |
| 2022/0258965 A1 | 8/2022 | Kappers et al. | |
| 2022/0258967 A1 | 8/2022 | Kappers et al. | |
| 2022/0363473 A1 * | 11/2022 | Peek | B65F 3/28 |
| 2022/0380123 A1 | 12/2022 | Buege et al. | |
| 2022/0415103 A1 | 12/2022 | Rocholl et al. | |
| 2023/0002152 A1 | 1/2023 | Koga et al. | |
| 2023/0042649 A1 | 2/2023 | Koga et al. | |
| 2023/0053238 A1 | 2/2023 | Koga et al. | |
| 2023/0089417 A1 | 3/2023 | Koga et al. | |
| 2023/0117427 A1 | 4/2023 | Turner et al. | |
| 2023/0120042 A1 | 4/2023 | Turner et al. | |
| 2023/0125077 A1 | 4/2023 | Gary et al. | |
| 2023/0127552 A1 | 4/2023 | Rocholl et al. | |
| 2023/0287715 A1 | 9/2023 | Kappers et al. | |
| 2024/0368927 A1 | 11/2024 | Attleson et al. | |

* cited by examiner

REFUSE VEHICLE WITH LOCKING TAILGATE

CROSS-REFERENCE TO RELATED PATENT APPLICATIONS

The present application claims the benefit of and priority to U.S. Provisional Patent Application No. 63/436,184, filed Dec. 30, 2022, and U.S. Provisional Patent Application No. 63/319,029, filed Mar. 11, 2022, both of which are incorporated herein by reference in their entirety.

BACKGROUND

The present disclosure relates generally to the field of rear-loading refuse vehicles and in particular locking assemblies that prevent movement of portions of the refuse vehicle during operation.

SUMMARY

One embodiment relates to a refuse vehicle. The refuse vehicle includes a chassis, a body, a tailgate, a tailgate actuator, and a tailgate locking assembly. The body supports the chassis and defines a receptacle configured to store refuse therein. The tailgate is positioned at an end of the receptacle and is rotatably coupled to the body. The tailgate actuator coupled to the tailgate and is configured to move the tailgate relative to the body between an open position and a closed position. The tailgate locking assembly is coupled to the body and the tailgate actuator and is configured to couple the tailgate to the body in response to the movement of the tailgate actuator.

Another embodiment relates to a tailgate locking assembly that can be used on a refuse vehicle. The tailgate locking assembly includes a mounting bracket, a pivot plate, a pivot arm, and a locking arm. The pivot plate is rotatably coupled to the mounting bracket. A first end of the pivot plate is configured to couple to a tailgate actuator for securing a tailgate to a body of a vehicle. The pivot arm is coupled to the pivot plate at a second end of the pivot plate and extends away from the pivot plate at an angle. The locking arm is rotatably coupled to the pivot arm and is spaced apart from the pivot plate by the pivot arm. The locking arm is configured to engage with a tailgate coupling mechanism of the body to secure the tailgate of the vehicle to a body of the vehicle.

Yet another embodiment relates to a method of locking a tailgate to a body of a refuse vehicle. The method includes controlling a tailgate actuator to move the tailgate to a closed position by engaging an end of the tailgate with the body so as to align a tailgate latch of the tailgate with a coupling mechanism of the body. The method also includes automatically actuating a tailgate locking assembly that is movably coupled to the tailgate actuator to couple a portion of the tailgate locking assembly to the coupling mechanism and thereby secure the tailgate latch to the coupling mechanism in response to an indication that the tailgate is in the closed position.

The invention is capable of other embodiments and of being carried out in various ways. Alternative embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
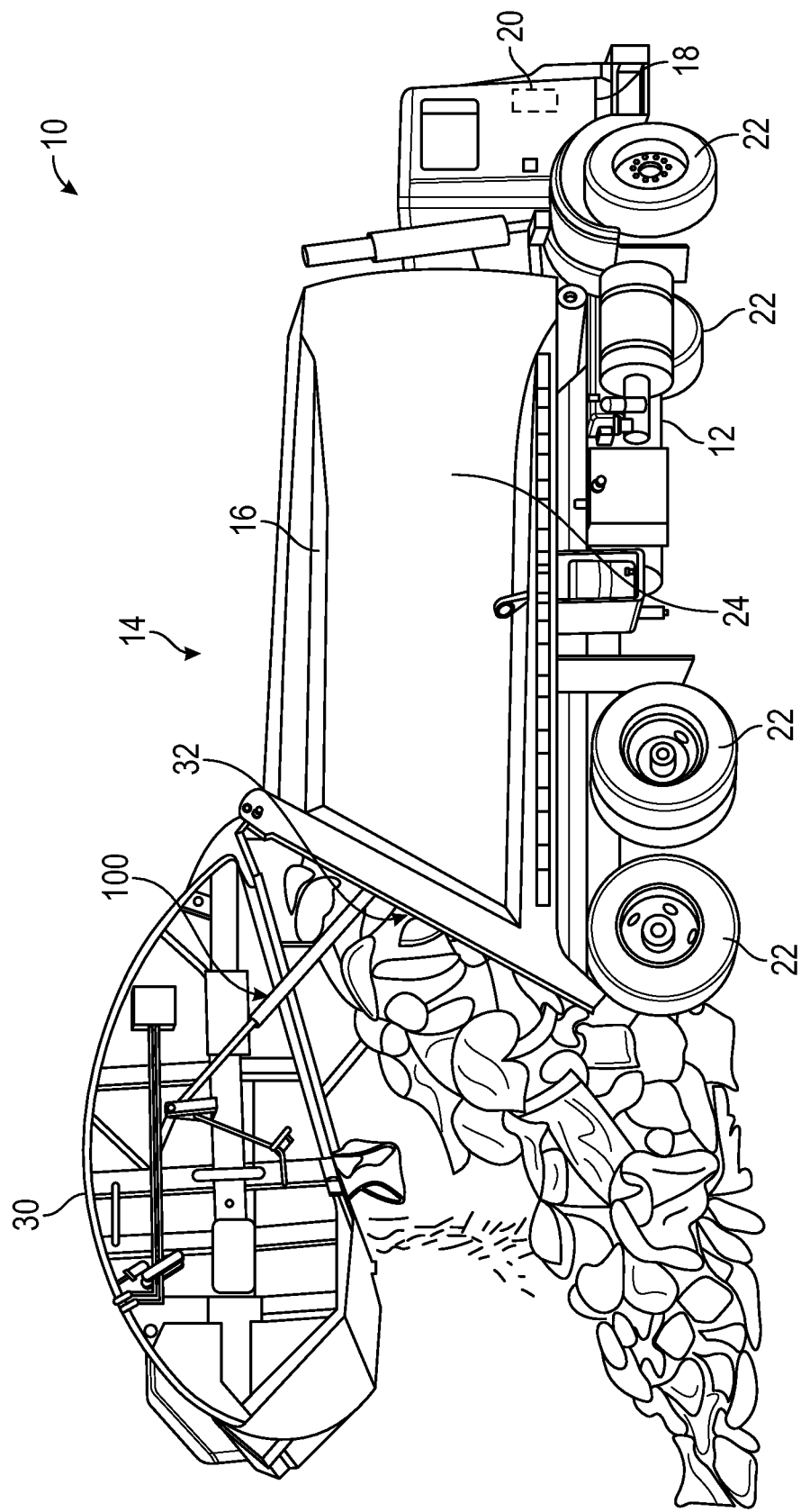
FIG. 1 is a rear perspective view of a refuse vehicle shown with the tailgate raised away from a chassis of the refuse vehicle, according to an embodiment.

Before turning to the figures, which illustrate the embodiments in detail, it should be understood that the present application is not limited to the details or methodology set forth in the description or illustrated in the figures. It should also be understood that the terminology is for the purpose of description only and should not be regarded as limiting.

Refuse vehicles collect a wide variety of waste, trash, and other material from residences and businesses. Operators of the refuse vehicle transport the material from various waste receptacles within a municipality to a storage or processing facility (e.g., a landfill, an incineration facility, a recycling facility, etc.). The material from these waste receptacles is stored in a refuse compartment of the refuse vehicle. While stored and/or during transit, the material may exert a force on a tailgate of a refuse vehicle acting to try and move the tailgate toward an open position and away from a refuse body of the refuse vehicle. To counteract this force, the tailgate can be locked, fastened, or otherwise secured to the body using a locking assembly that prevents the tailgate from moving relative to the body. In one embodiment, the tailgate may be locked to the body using manually operated locks or using separate actuator on the refuse vehicle, such as a deadbolt to lock the tailgate in place with respect to the body.

Disclosed herein are tailgate locking assemblies that are configured to automatically couple the tailgate to a refuse body during actuation of the tailgate to a closed position to thereby improve cycle times for unloading operations, reduce operating complexity, and reduce the number of actuators required for tailgate operation and control.

According to an embodiment, a refuse vehicle includes a tailgate actuator configured to manipulate the position of a tailgate of the refuse vehicle, and a tailgate locking assembly configured to automatically lock and/or unlock the tailgate in position with respect to a refuse body of the refuse vehicle (e.g., in response to actuation of the tailgate actuator, etc.). The tailgate locking assembly may be coupled to the body of the refuse vehicle and the tailgate actuator and may be powered by the tailgate actuator during an opening and/or closing operation of the tailgate relative to the refuse body. The tailgate locking assembly may include a mounting bracket, a pivot plate, a pivot arm, and a locking arm (e.g., a locking member, a rod, a bar, etc.). The tailgate locking assembly may be configured so that when the tailgate actuator is operated to manipulate the tailgate, the locking arm is displaced, moved, or otherwise actuated between an unlocked position (e.g., a first position, etc.) and a locked position (e.g., a second position, etc.). Such a design may provide a variety of benefits including: (1) decreasing the cycle time needed to unload the refuse vehicle, (2) reducing the number of mechanical components needed to lock or otherwise secure the tailgate in position relative to the refuse body, and (3) reducing operator interaction with the refuse vehicle during unloading operations.

In at least one embodiment, the tailgate is positioned at an end of the refuse body of the refuse vehicle and is rotatably coupled to the body so as to facilitate ejection of refuse and other material from the body during unloading operations. The tailgate actuator may be coupled to the tailgate and the body and may be configured to move the tailgate between an open position in which refuse may be ejected from the body, and a closed position in which the tailgate is secured to the refuse body so that the tailgate is fixed in position relative to the refuse body. The tailgate locking assembly may be coupled to the body and the tailgate actuator so as to coordinate operation of the tailgate locking assembly and the tailgate actuator (e.g., to engage or disengage a tailgate locking mechanism in response to the movement of the tailgate actuator such as during opening and/or closing operations of the tailgate, etc.).

As shown in FIG. 1, a vehicle, shown as refuse vehicle 10 (e.g., garbage truck, waste collection truck, sanitation truck, etc.), includes a chassis, shown as a frame 12, and a body assembly, shown as body 14, coupled to the frame 12. The body 14 defines an on-board receptacle 16 (e.g., a refuse body, etc.) and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processors, etc.). The refuse vehicle 10 further includes a prime mover 20 coupled to the frame 12 at a position beneath the cab 18. The prime mover 20 provides power to a plurality of motive/tractive members, shown as wheels 22, and to other systems of the vehicle (e.g., a pneumatic system, a hydraulic system, etc.). The prime mover 20 may be configured to use a variety of fuels (e.g., gasoline, diesel, bio-diesel, ethanol, natural gas, etc.), according to various embodiments. According to an alternative embodiment, the prime mover 20 is one or more electric motors coupled to the frame 12 or other parts of the refuse vehicle 10. The electric motors may consume electrical power from an on-board storage device (e.g., batteries, ultra-capacitors, etc.), from an on-board generator (e.g., an internal combustion engine, high efficiency solar panels, regenerative braking system, etc.), or from an external power source (e.g., overhead power lines) and provide power to the systems of the refuse vehicle 10. According to some embodiments, the refuse vehicle 10 may be in other configurations than that shown in FIG. 1. For example, the refuse vehicle 10 may be configured as a front loading refuse vehicle, a side loading refuse vehicle, a rear loading refuse vehicle, a curb-sort recycling refuse vehicle, or in another refuse collection and/or loading configuration.

Figure 2:
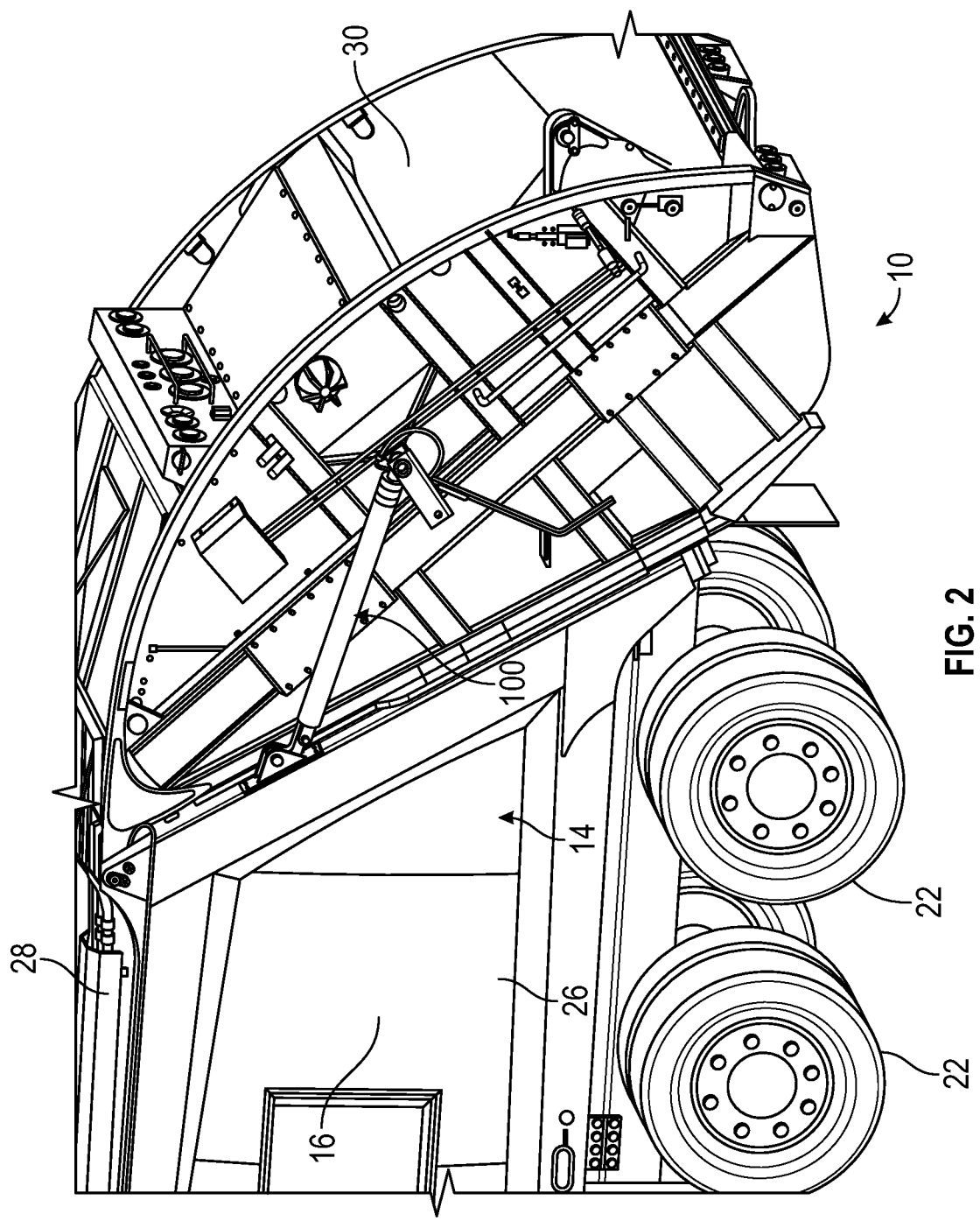
FIG. 2 is a rear perspective view of the refuse vehicle of FIG. 1 showing the tailgate in a closed position.

According to an embodiment, the refuse vehicle 10 is configured to transport refuse from various waste receptacles within a municipality to a storage or processing facility (e.g., a landfill, an incineration facility, a recycling facility, etc.). As shown in FIGS. 1 and 2, the body 14 and on-board receptacle 16, in particular, include a first sidewall 24 (e.g., panels, etc.), a second sidewall 26, a top wall 28 (e.g., panel, cover, etc.) and a tailgate 30. The second sidewall 26 is positioned opposite of the first sidewall 24. The tailgate 30 is movably (e.g., rotatably, etc.) coupled to the on-board receptacle 16 and is positioned at the rear end of the body 14. The tailgate 30 may be rotatably coupled to the body 14 so as to pivot about pivot pins positioned along a rear end of the top wall 28 of the on-board receptacle 16. The first sidewall 24, the second sidewall 26, the top wall 28, and the tailgate 30 may together define a collection chamber 32 (e.g., a refuse compartment, an interior cavity, etc.) of the receptacle 16. In some embodiments, the on-board receptacle 16 is shaped as a generally rectangular box having two transverse upper edges, two longitudinal upper edges, two transverse lower edges, and two longitudinal lower edges. The longitudinal edges extend along the length of the on-board receptacle 16 and the transverse edges extend across the length of the on-board receptacle 16, according to an embodiment. Loose refuse and/or other material may be placed into the collection chamber 32, where it may be thereafter compacted to increase utilization of the collection chamber 32 during vehicle operations. The collection chamber 32 may provide temporary storage for refuse and/or other material during transport to a waste disposal site or a recycling facility, for example. In some embodiments, at least a portion of the receptacle 16 and collection chamber 32 extend over or in front of the cab 18.

The on-board receptacle 16 and/or collection chamber 32 may be positioned behind the cab 18. In some embodiments, the collection chamber 32 includes a hopper volume and a storage volume. Refuse is initially loaded into the hopper volume by a manual (e.g. by hand) or automatic means (e.g., lifting system) and is thereafter compacted into the storage volume. According to an embodiment, the hopper volume is positioned at least partially within the tailgate 30. In other embodiments, the hopper volume is positioned between the storage volume and the cab 18 (i.e., refuse is loaded into a position behind the cab 18 and stored in a position further toward the rear of the refuse vehicle 10). Further, as shown in FIG. 2, the refuse vehicle may include a tailgate locking assembly to secure the tailgate 30 to the receptacle 16 (e.g., rear body, refuse body, etc.) of the refuse vehicle 10 and prevent the tailgate 30 from inadvertently opening during loading operations.

Figure 3:
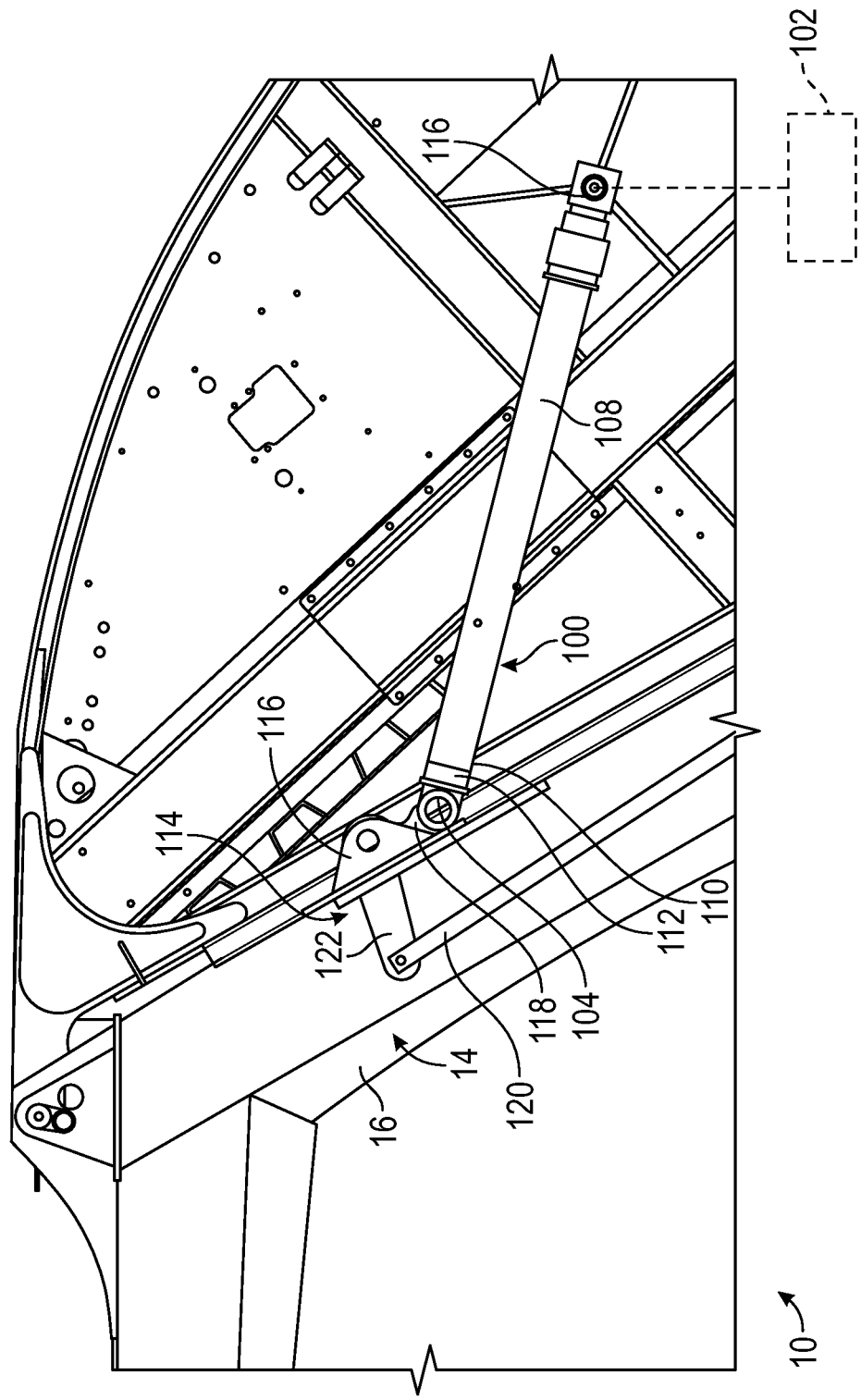
FIG. 3 is a side perspective view of a portion of a refuse vehicle with a tailgate locking assembly in an unlocked position, according to an embodiment.

As shown in FIGS. 1-3, the refuse vehicle 10 includes a tailgate actuator assembly, shown as a tailgate actuator 100. The tailgate actuator 100 is configured to move (e.g., pivot, rotate, etc.) the tailgate 30 about the pivot pins between an open position (e.g., a first tailgate position, etc.)—away from the receptacle 16—and a closed position (e.g., a second tailgate position, etc.) in which the tailgate 30 is rotated into engagement with the receptacle 16.

The tailgate actuator 100 may be rotatably coupled to the body 14 and the tailgate 30 so as to reposition the tailgate 30 relative to the body 14. As shown in FIG. 2, a first end of the tailgate actuator 100, shown as a first actuator end 104 (e.g. first tailgate actuator end, etc.) may be coupled (e.g., attached, fixed, welded, fastened, riveted, adhesively attached, bonded, pinned, bolted, screwed, etc.) to the body 14 (e.g., along a rear pillar or support member of the body, etc.). A second end of the tailgate actuator 100, shown as second actuator end 106 (e.g. a second tailgate actuator end, etc.) may be coupled (e.g., attached, fixed, welded, fastened, riveted, adhesively attached, bonded, pinned, bolted, screwed, etc.) to the tailgate 30. In at least one embodiment, the tailgate actuator 100 is coupled to the tailgate 30 at a central position along a side wall of the tailgate 30 or is otherwise positioned so that the tailgate actuator 100 applies a longitudinally directed force (e.g., a force at least partially oriented along a longitudinal direction, substantially parallel to the chassis of the refuse vehicle 10).

In some embodiments, the tailgate actuator 100 is communicatively coupled to a processing unit shown as a processor 102 that controls operation of the tailgate actuator 100. The processor 102 may be configured to provide signals to selectively actuate the tailgate actuator 100. In some embodiments, the processor 102 also monitors a position of the tailgate actuator 100 and/or the tailgate 30 (e.g., through communication with a position sensor within the tailgate actuator 100 and/or a position sensor within the tailgate 30, as will be further described). In some embodiments, the processor 102 communicates with a throttle and/or clutch of a vehicle transmission so that the tailgate actuator 100 cannot be deployed or otherwise adjusted outward from the fully-retracted position when the processor 102 receives an indication that the vehicle 10 is traveling over a threshold speed (e.g., 10 mph). In another embodiment, the processor 102 is configured to receive signals from sensors (e.g., proximity sensors, cameras, etc.) onboard the refuse vehicle 10 that indicate an unsafe condition for moving the on-board receptacle 16 towards the fully deployed position. In such an arrangement, the processor 102 may be configured to prevent adjustment of tailgate actuator 100 outward from the fully-retracted position so as to prevent injury to an operator or damage to the refuse vehicle 10. In yet other embodiments, the tailgate actuator 100 is manually controllable via a control lever of a hydraulic pump of the refuse vehicle 10.

In some embodiments, the tailgate actuator 100 can be controlled from within a central location, such as the cab 18 of the refuse vehicle 10. The cab 18 may include control panel including a series of inputs that can be actuated by a user to perform different operations. The control panel may also be in communication the processor 102 to provide signals and/or commands (e.g., command signals, etc.) that can be subsequently executed by the processor 102 to control actuation of the tailgate and/or tailgate locking assembly.

The tailgate actuator 100 may include a hydraulic cylinder that is fluidly coupled to a hydraulic pump onboard the refuse vehicle 10. In other embodiments, the tailgate actuator 100 includes an electric actuator (e.g., linear actuator, etc.) and/or another actuator type. As shown in FIG. 3, the tailgate actuator 100 may include an actuator arm 108 and a tailgate actuator sleeve, shown as sleeve 110. During unloading operations (e.g., when an operator desires to eject waste and/or other material from the receptacle 16, etc.), the actuator arm 108 extends out of the sleeve 110 (e.g., from a retracted position to an extended position, etc.) causing a space 112 to form within the sleeve 110 and causing the tailgate 30 to move upwardly and outwardly from the closed position to the open position. In some embodiments, as the actuator arm 108 extends from the body 14 and out of the sleeve 110, a fluid (e.g., oil, etc.) fills the space 112 between the actuator arm 108 and the sleeve 110. After ejecting the refuse and/or other material from the refuse vehicle 10, the tailgate actuator may move back toward a retracted position in which the actuator arm 108 retracts into the sleeve 110 and causing the tailgate 30 to move downwardly and inwardly from the open position to the closed position (e.g., to pivot from the open position back to the closed position, so that a lower end of the tailgate 30 engages with the receptacle 16).

Referring now to FIGS. 3-7, the refuse vehicle 10 may include a tailgate locking assembly, shown as locking assembly 114. The locking assembly 114 may be configured to engage the tailgate 30 to couple a lower end of the tailgate 30 (or other portion of the tailgate 30) to the receptacle 16 and to prevent the tailgate 30 from inadvertently opening when the tailgate 30 is in the closed position. In at least one embodiment, the locking assembly 114 includes a trunnion or another bearing support, shown as mounting bracket 116 (e.g., flange bracket, pivot bracket, pinion bracket, etc.) that is coupled to the body 14 and is configured to rotatably couple (e.g., pivotably couple, etc.) the tailgate actuator 100 to the body 14 (e.g., the receptacle 16) of the refuse vehicle 10. The locking assembly 114 may further include a pivot plate (e.g., a pivot flange, a pivot member, etc.) and/or pivot arm, a tailgate locking arm, a tailgate coupling/locking mechanism, and a tailgate latch.

Figure 4:
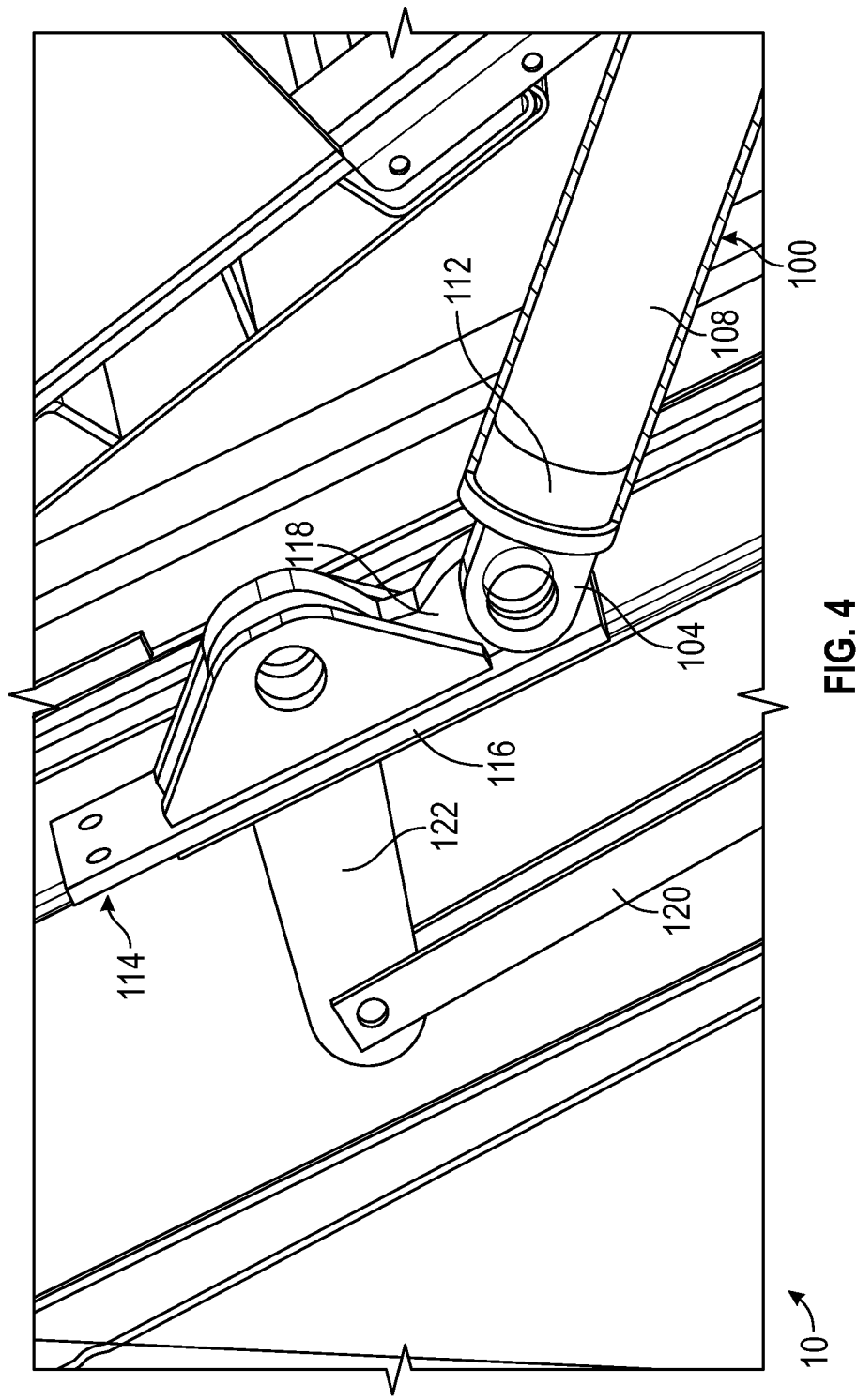
FIG. 4 is perspective view of the tailgate locking assembly of FIG. 3.
Figure 5:
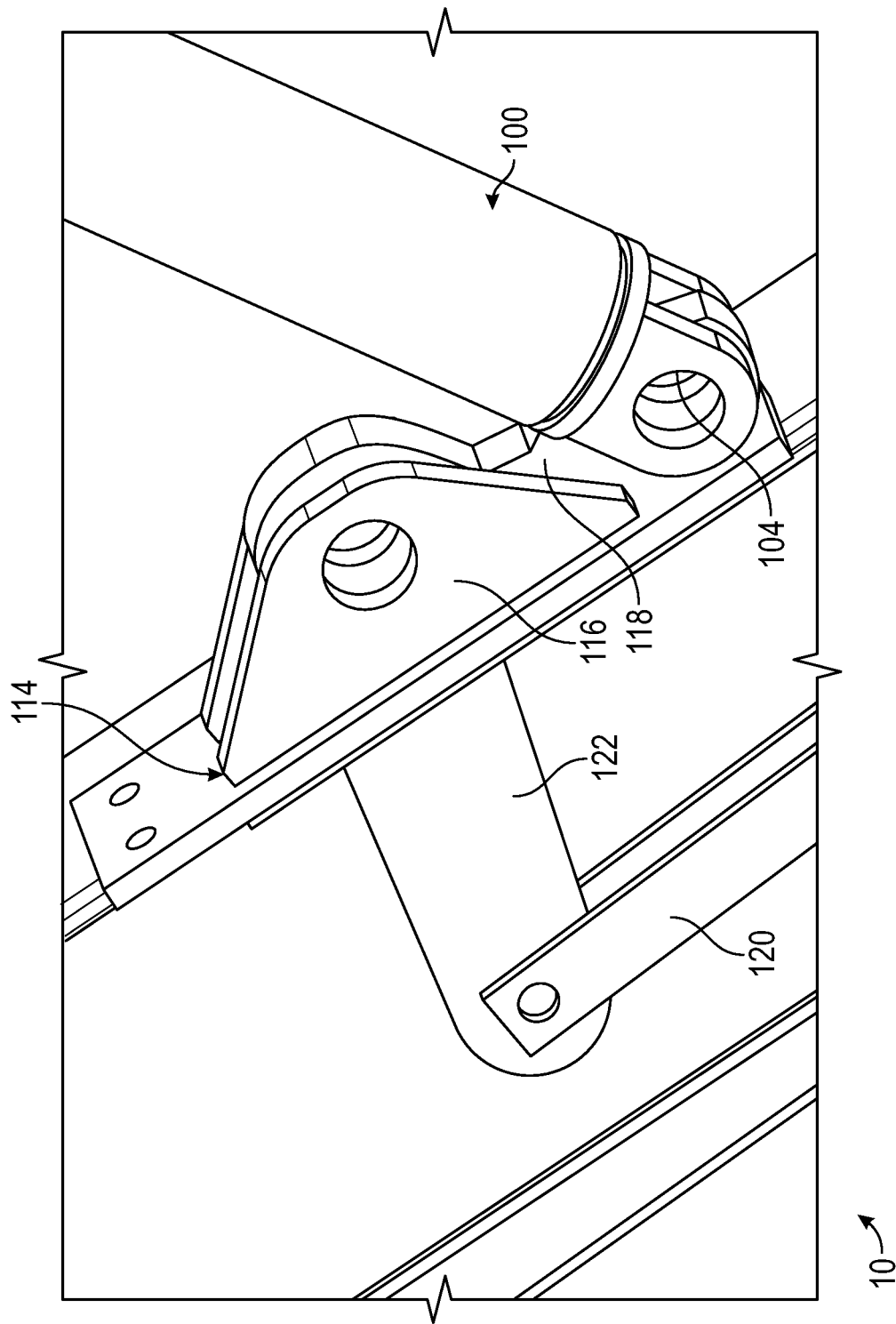
FIG. 5 is a perspective view of the tailgate locking assembly of FIG. 3.
Figure 6:
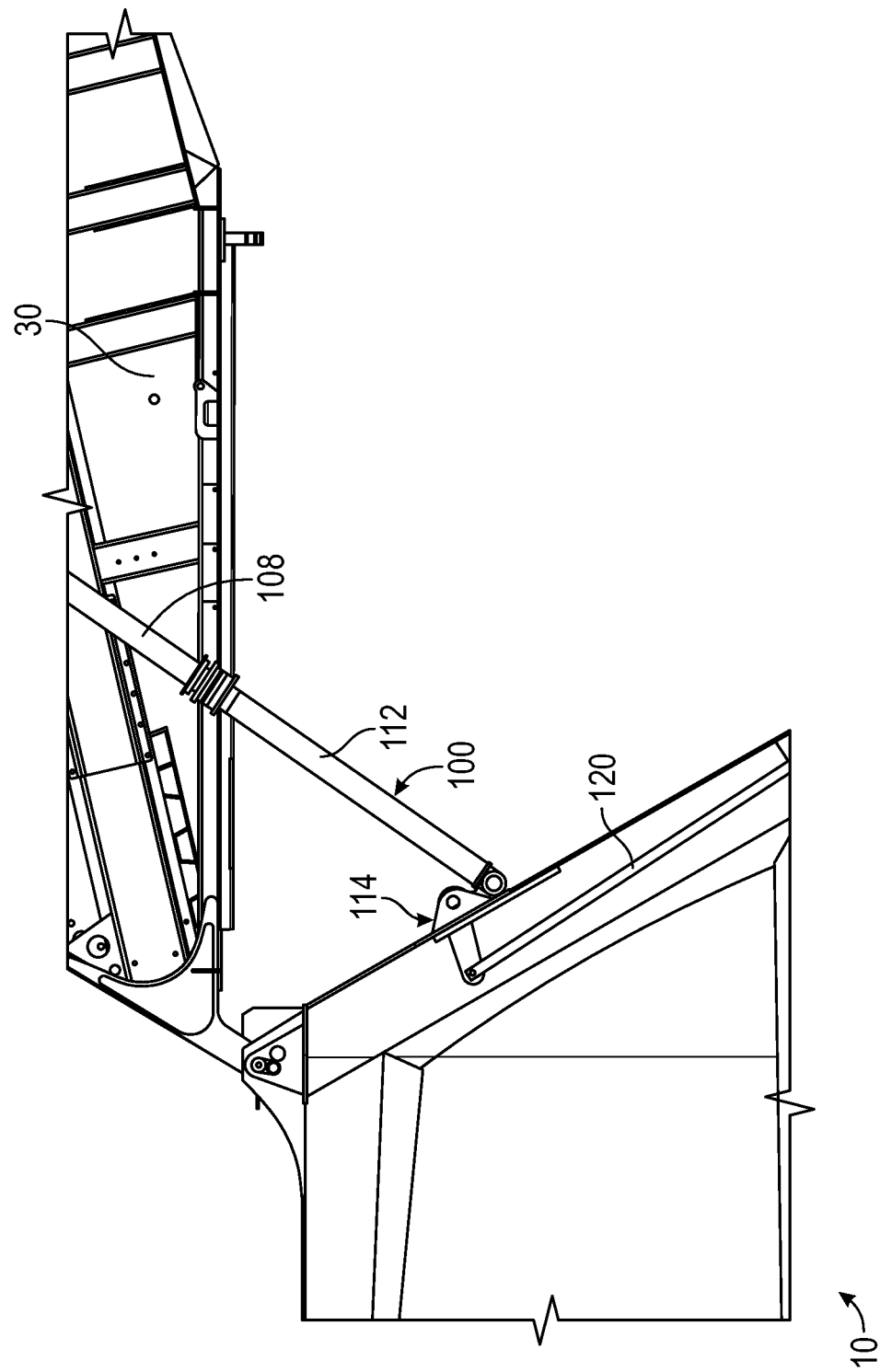
FIG. 6 is a side perspective view of the refuse vehicle of FIG. 3 with a fully opened tailgate.
Figure 7:
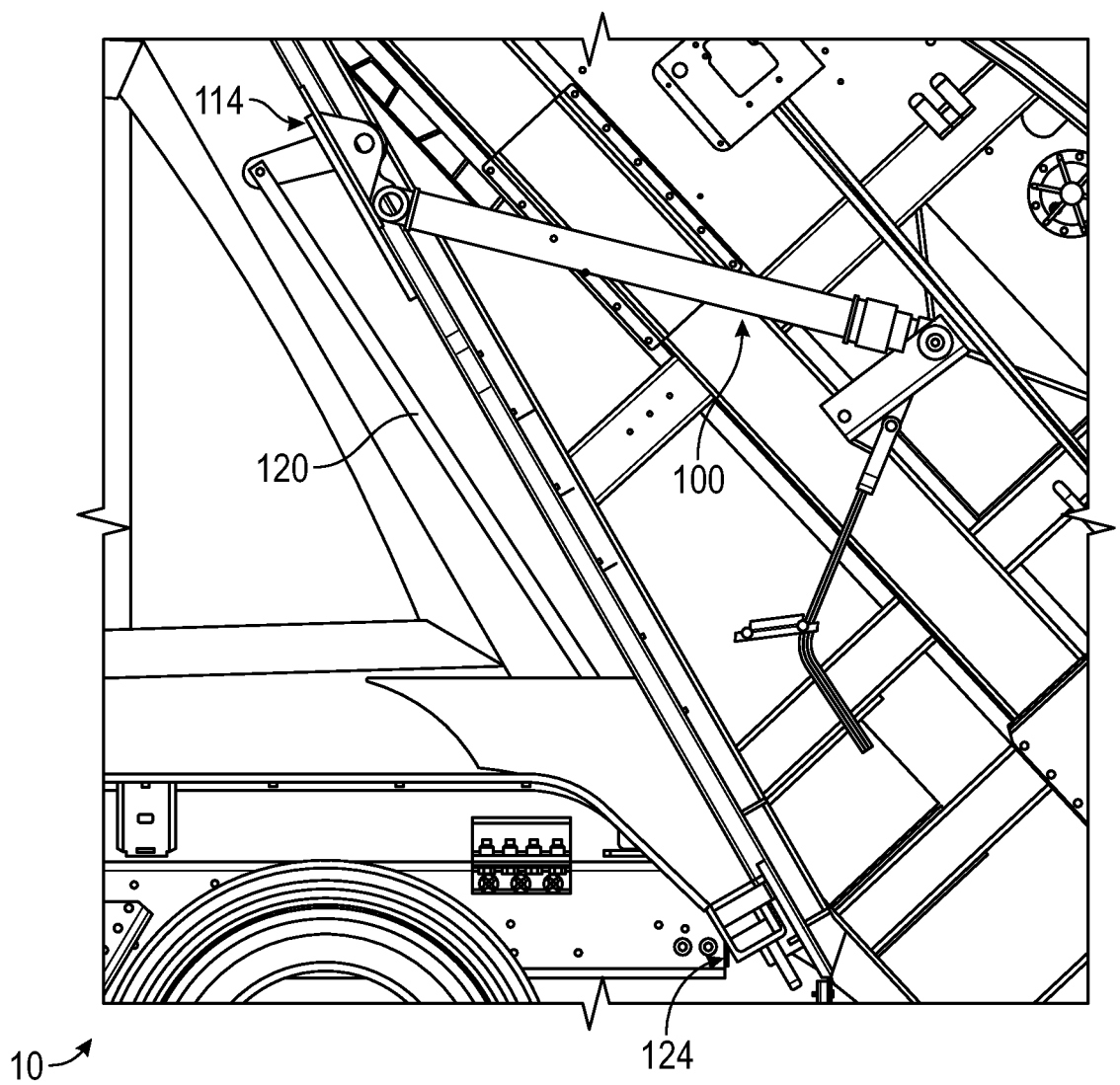
FIG. 7 is a side perspective view of a tailgate of the refuse vehicle of FIG. 3, shown with the tailgate in an unlocked position.

The pivot plate 118 may be configured to move relative to the mounting bracket 116 in response to movement of the tailgate actuator 100 to automatically lock or unlock the tailgate during operation. The pivot plate 118 may be rotatably coupled at a first end (e.g., a first plate end, a proximal end, etc.) of the pivot plate 118 to the mounting bracket 116 via a pivot member (e.g., a lug, a shaft, etc.). The pivot plate 118 may be coupled at a second end (e.g., a second plate end, a distal end, etc.) to the first actuator end 104 of the tailgate actuator 100. The pivot plate 118 may be configured pivot in response to movement of the tailgate actuator 100 (in response to an applied force from the tailgate actuator 100). As shown in FIG. 4-5, the pivot plate 118 is engaged with (e.g., in-contact, stopped, etc.) a portion of the mounting bracket 116 when the tailgate 30 is in a closed position. The pivot plate 118 moves away from the portion when the tailgate actuator 100 begins expanding to move the tailgate 30 into the open position.

The locking assembly 114 further includes a tailgate locking arm, shown as locking arm 120 (e.g., rod, bar, etc.), that is configured to engage the tailgate and connection mechanism on the body to prevent relative movement between the body and the tailgate 30. The locking arm 120 may be configured to be displaced from an unlocked position (e.g., a first position, etc.) to a locked position (e.g., a second position, etc.) or from locked position to an unlocked position such that the tailgate 30 maybe secured or released from the body 14. In some embodiments, the locking arm 120 is operably coupled to the tailgate actuator 100 and is powered into movement by the tailgate actuator 100. The locking arm 120 may be positioned within an interior cavity of the on-board receptacle 16 (e.g., a cross-member, a rear support member, a rear pillar, a rear post, etc.), which conceals the locking arm 120 and reduces the number of moving components exterior of the refuse vehicle.

Figure 8:
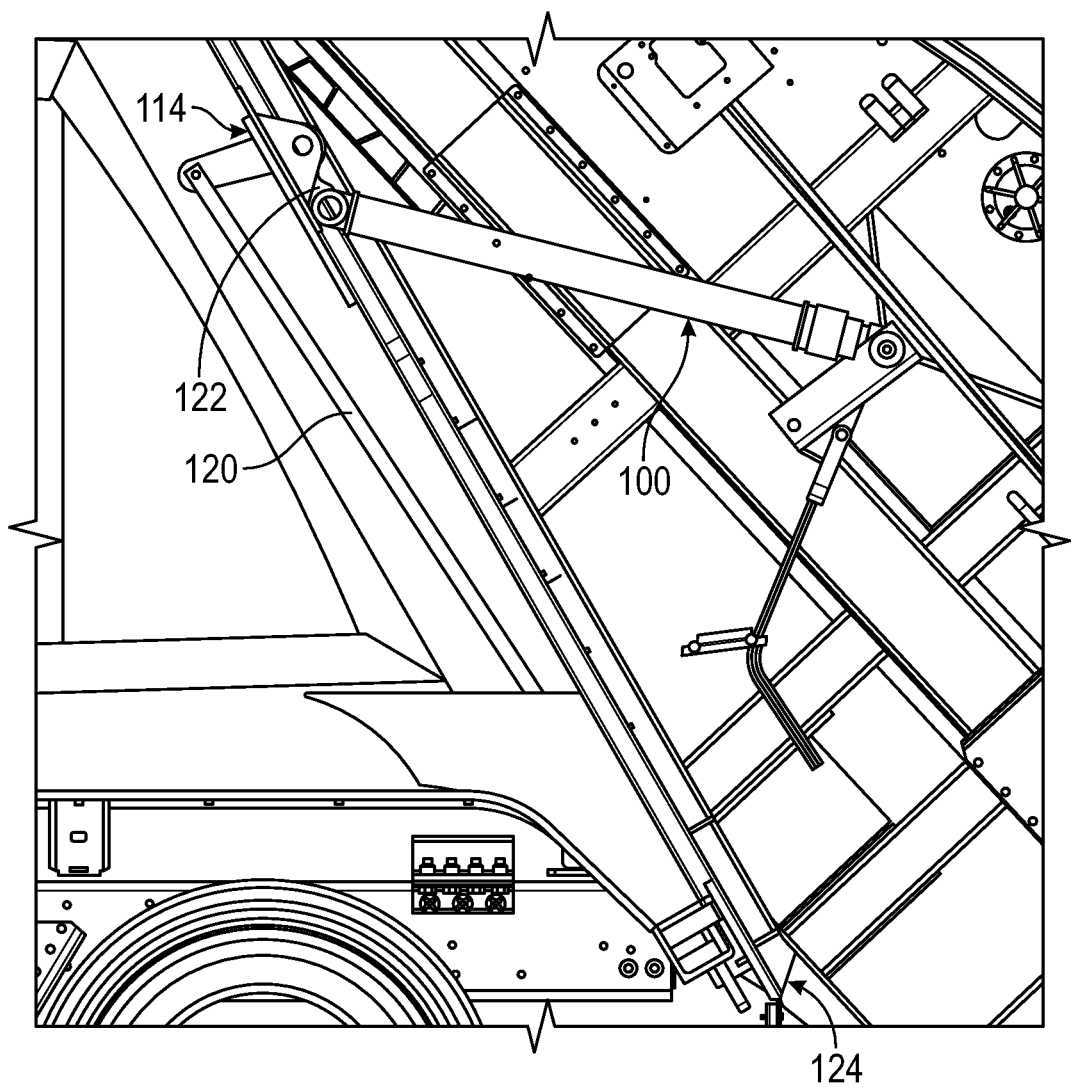
FIG. 8 is another side perspective view of the refuse vehicle of FIG. 3, shown with the tailgate in an unlocked position.
Figure 9:
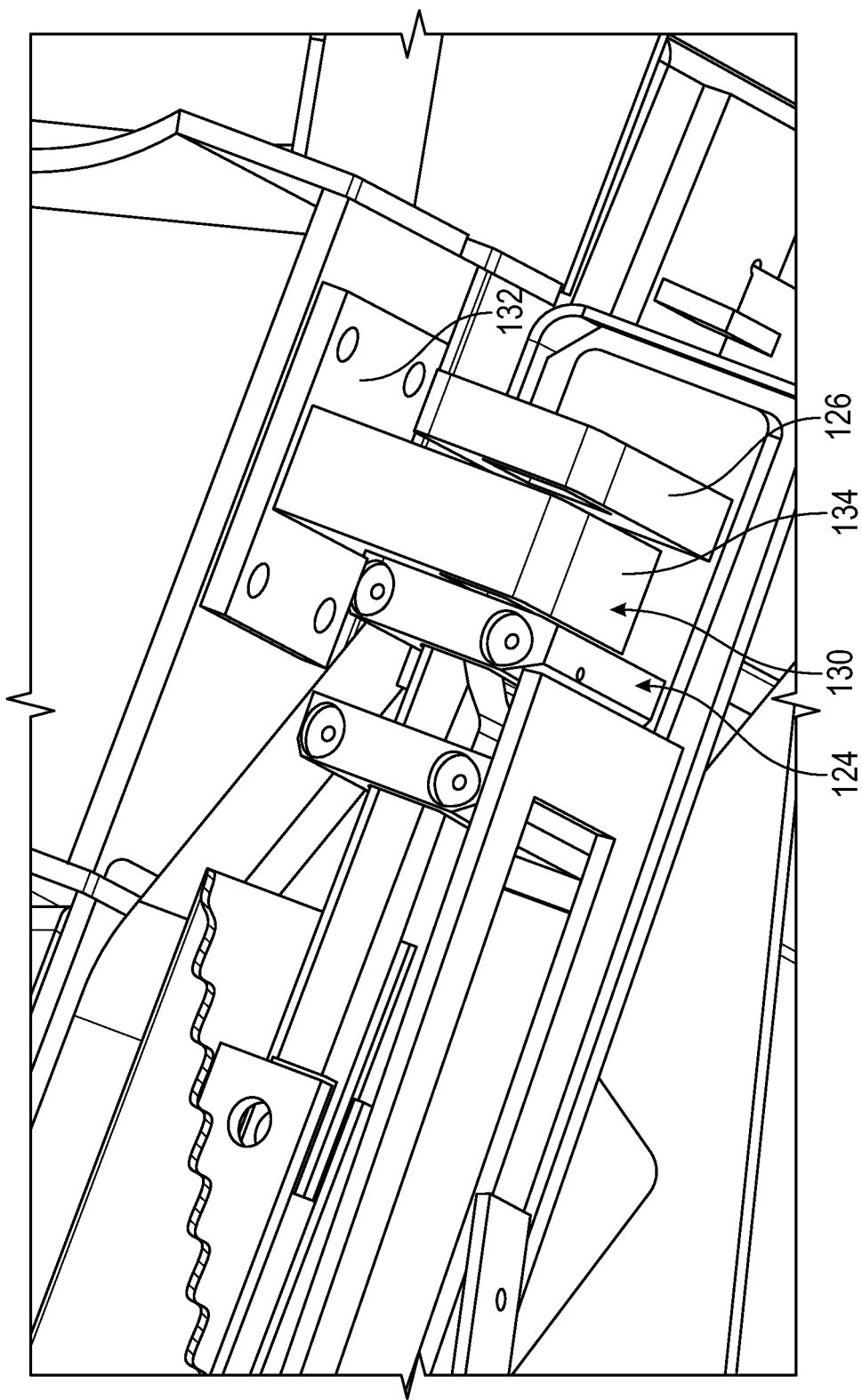
FIG. 9 is a perspective view of a tailgate coupling mechanism of the tailgate locking assembly of FIG. 3.
Figure 10:
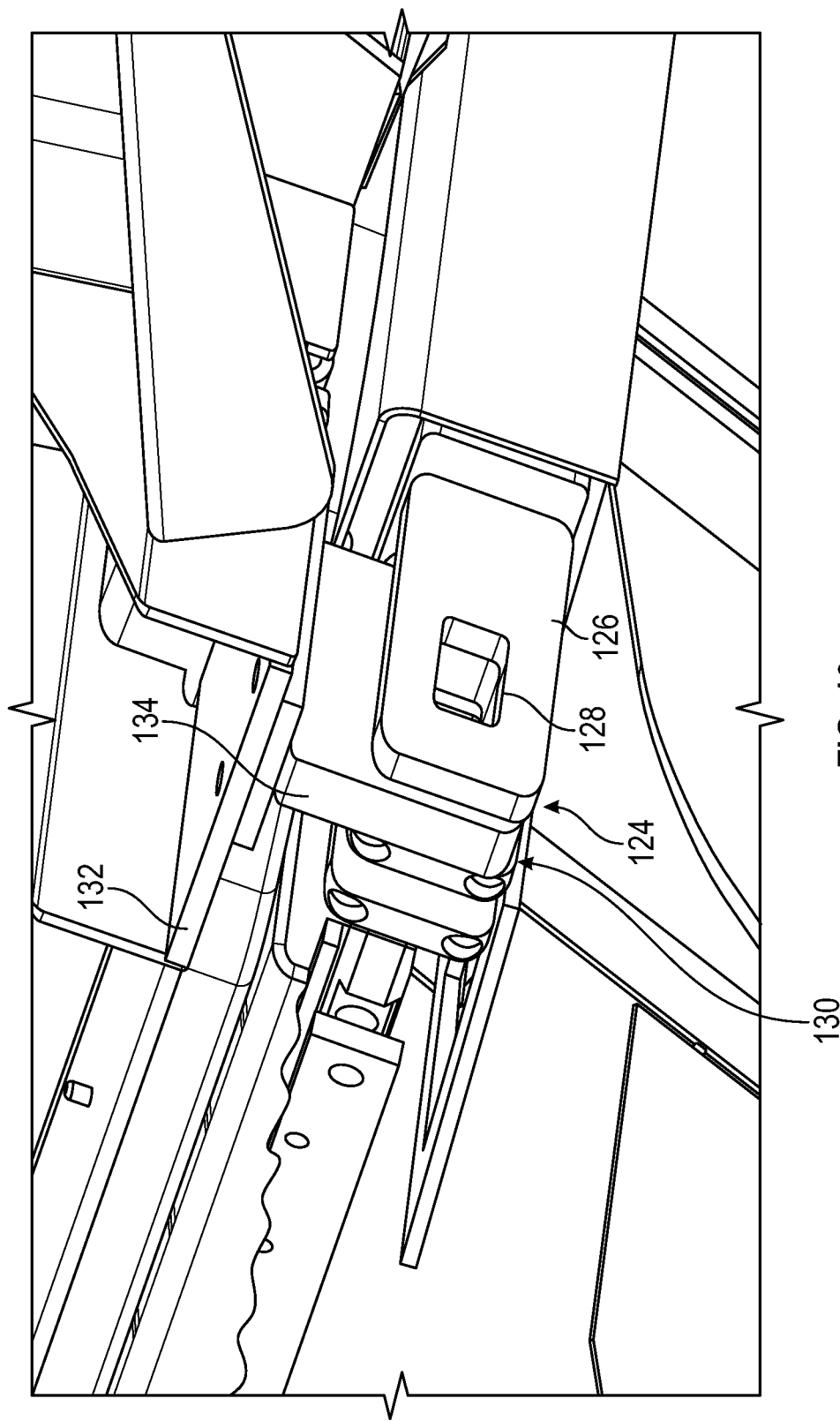
FIG. 10 is a bottom perspective view of the tailgate coupling mechanism of FIG. 9.
Figure 11:
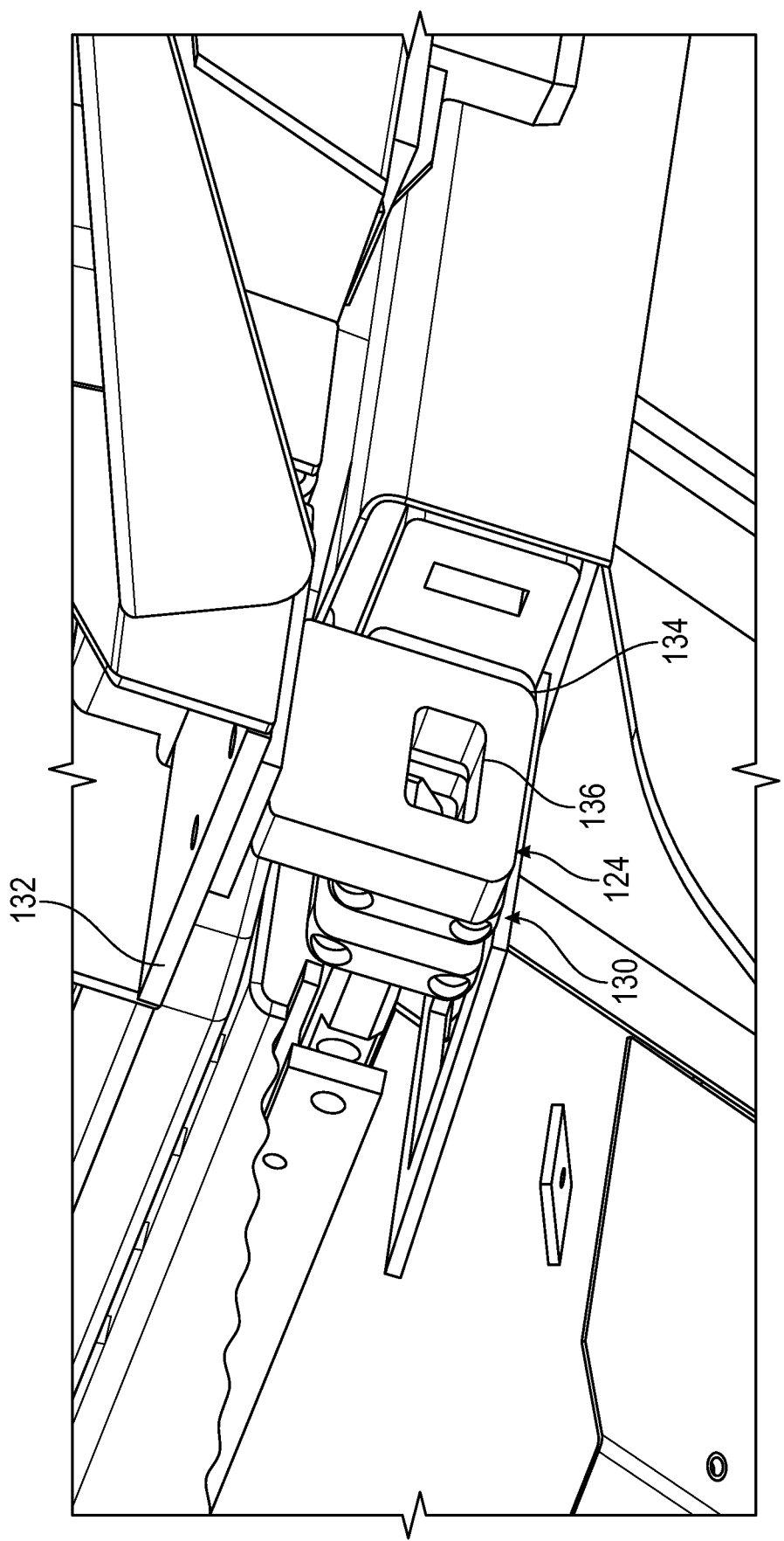
FIG. 11 is bottom perspective view of a tailgate flange of the tailgate coupling mechanism of FIG. 9.

The locking assembly 114 may also include a pivot arm 122 (e.g., bar, rod, etc.) that is configured to control movement of the locking arm 120 in response to movement of the tailgate actuator 100 (e.g., to displace the locking arm 120 in response to movement of the tailgate actuator 100 such that the tailgate 30 maybe secured or released from the body 14). that is fixedly coupled to the pivot plate 118. The pivot arm 122 may be rotatably coupled at a first pivot arm end to the mounting bracket 116 and the pivot plate 118 via the pivot member. The pivot arm 122 is rotatably coupled at a second pivot arm end to the locking arm 120 via a second pivot member. In at least one embodiment, the pivot arm 122 is integrally formed with the pivot plate 118 as a monolithic structure (e.g., a cam link, etc.) from a single piece of material. As shown in FIG. 8, the pivot arm 122 may extend away from the pivot plate 118 at an angle (e.g., at an angle of approximately 60°, 70°, 80°, 90°, or any angle between an including the foregoing angles). In some embodiments, the pivot arm 122 extends through the mounting bracket 116, through an opening disposed between support arms of the mounting bracket 116 that engage with a bearing/bushing assembly that couples the pivot plate 118 to the mounting bracket 116. It should be appreciated that the angle formed between the pivot arm 122 and the pivot plate 118 may vary depending on the arrangement of the tailgate locking assembly and the desired range of movement of the locking arm 120.

As shown in FIGS. 7-12, the refuse vehicle 10 may include a tailgate coupling mechanism, shown as coupling mechanism 124. The coupling mechanism 124 may be configured to lock or otherwise secure the tailgate 30 to the refuse vehicle 10 by movement of the locking arm 120 relative to the coupling mechanism 124. The coupling mechanism 124 may be coupled (e.g., fixedly) to the body 14 (e.g., the receptacle 16) and aligned with the locking arm 120. The coupling mechanism 124 may also include a latch receiving bracket, shown as a receiving bracket 126 (e.g., flange bracket, U-bracket, etc.) that is fixedly coupled to the body 14 and is spaced apart from the locking arm 120 when the tailgate 30 is in an open position. The receiving bracket 126 may include a receiving slot 128 (e.g., through-hole opening, etc.) sized to receive the locking arm 120 therein during locking operations.

Figure 12:
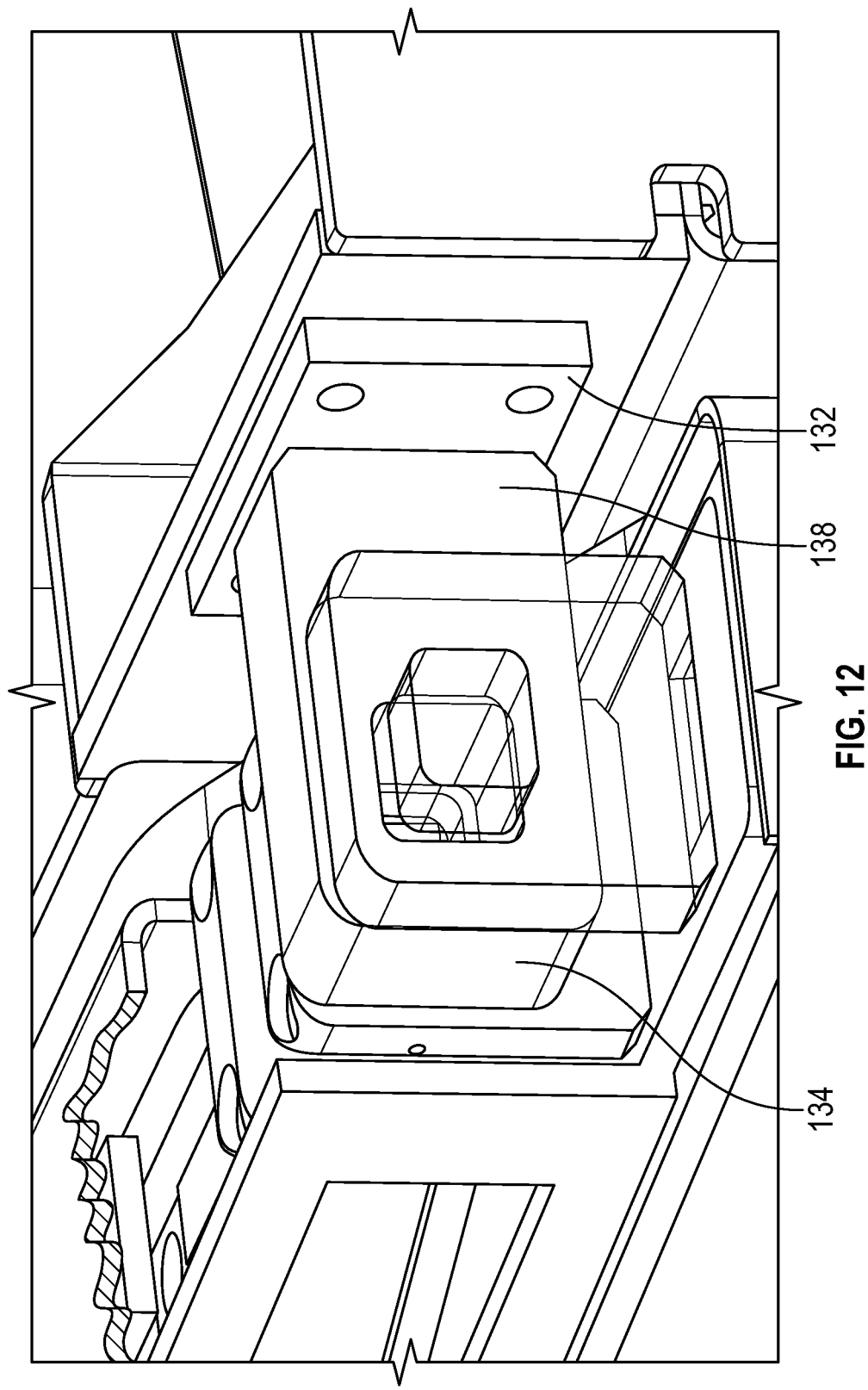
FIG. 12 is another bottom perspective view of the tailgate flange of FIG. 11.

The tailgate latch 130 may be coupled to the tailgate 30, at a lower end of the tailgate 30, and may be configured to secure the tailgate 30 to body 14 (e.g., the receptacle 16). The tailgate latch 130 may include a coupling plate 132 (e.g., bracket, plate, etc.) and a flange 134. The coupling plate 132 may be coupled to the tailgate 30 and the flange 134 may be coupled to the coupling plate 132 and may extend away from the coupling plate 132 (e.g., laterally away from a side wall of the tailgate 30). In some embodiments, the flange 134 and the coupling plate 132 are fastened together. In other embodiments, the flange 134 may be welded to the coupling plate 132 or may be integrally formed (e.g., cast) with the coupling plate 132 as a monolithic structure from a single piece of material. The flange 134 may include a slot 136 sized to receive the locking arm 120 therein during locking operations to prevent relative movement between the flange 134 and the coupling mechanism 124 on the body 14. As shown in FIG. 12, the flange 134 may be sized to be received within a gap between the receiving bracket 126 and a lower end of the cross member or support flange that supports the locking arm 120 so that in the closed position (i) the flange 134 is disposed between the cross member and the receiving bracket 126, and (ii) the slot 136 is axially aligned with the receiving slot 128 when the tailgate 30.

A method of operating the tailgate locking assembly includes commanding, by the control module of the refuse vehicle, the tailgate actuator 100 to reposition the tailgate from an open position to a closed position. The method may include controlling the tailgate actuator 100 to cause at least a portion of the tailgate actuator 100 to move with respect to the body. Moving the tailgate actuator 100 may include retracting the actuator arm 108 of the tailgate actuator 100 into the sleeve 110 of the tailgate actuator 100. The method may include closing the tailgate 30 by engaging the tailgate 30 (e.g., a lower end of the tailgate 30) with the receptacle 16 and aligning (e.g., axially, etc.) the tailgate latch 130 with the coupling mechanism 124 so that the receiving slot 128 of the receiving bracket and the slot 136 of the flange 134 are axially aligned and/or so that the locking arm 120 may selectively slide through the receiving slot 128 and the slot 136 to the locked position thereby locking the tailgate 30. The method may include automatically actuating the tailgate locking assembly in response to an indication that the tailgate 30 is in a closed position, for example, in response to an applied longitudinally directed force from the tailgate actuator 100.

Figure 13:
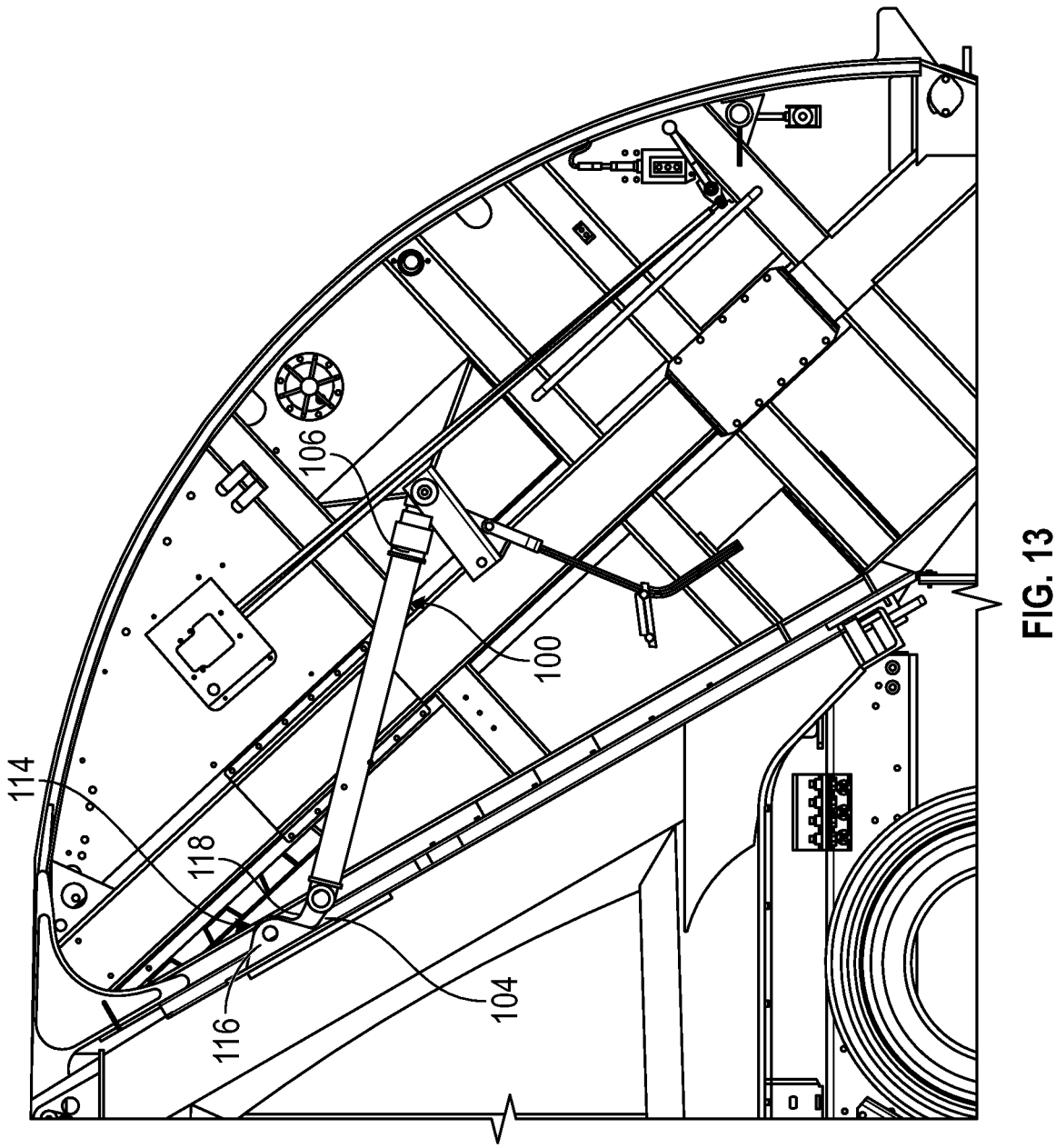
FIG. 13 is a side view of a tailgate locking assembly of a refuse vehicle shown with the tailgate locking assembly in a locked position, according to an embodiment.
Figure 14:
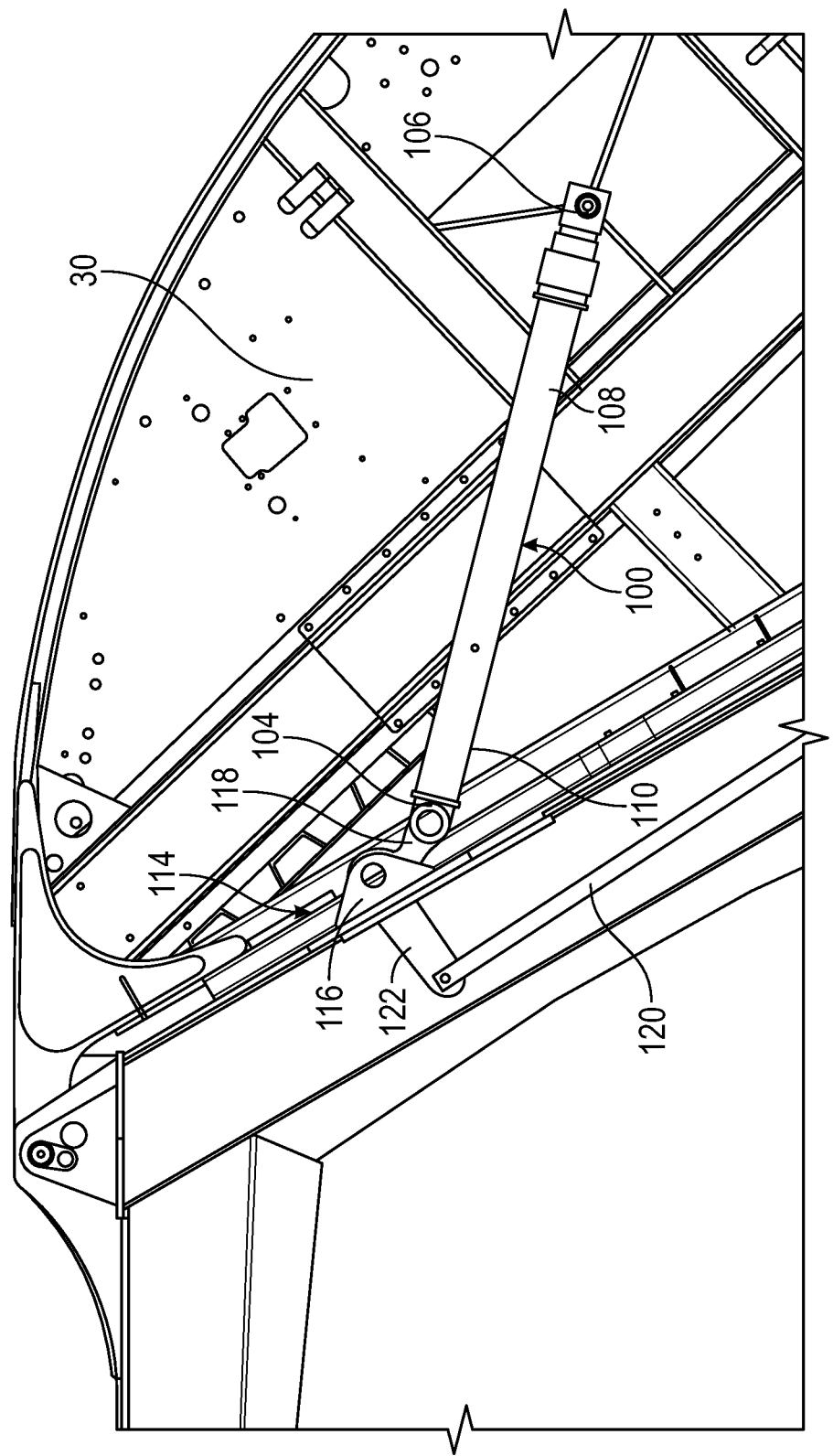
FIG. 14 is a side cross-sectional view of the tailgate locking assembly of FIG. 13.
Figure 15:
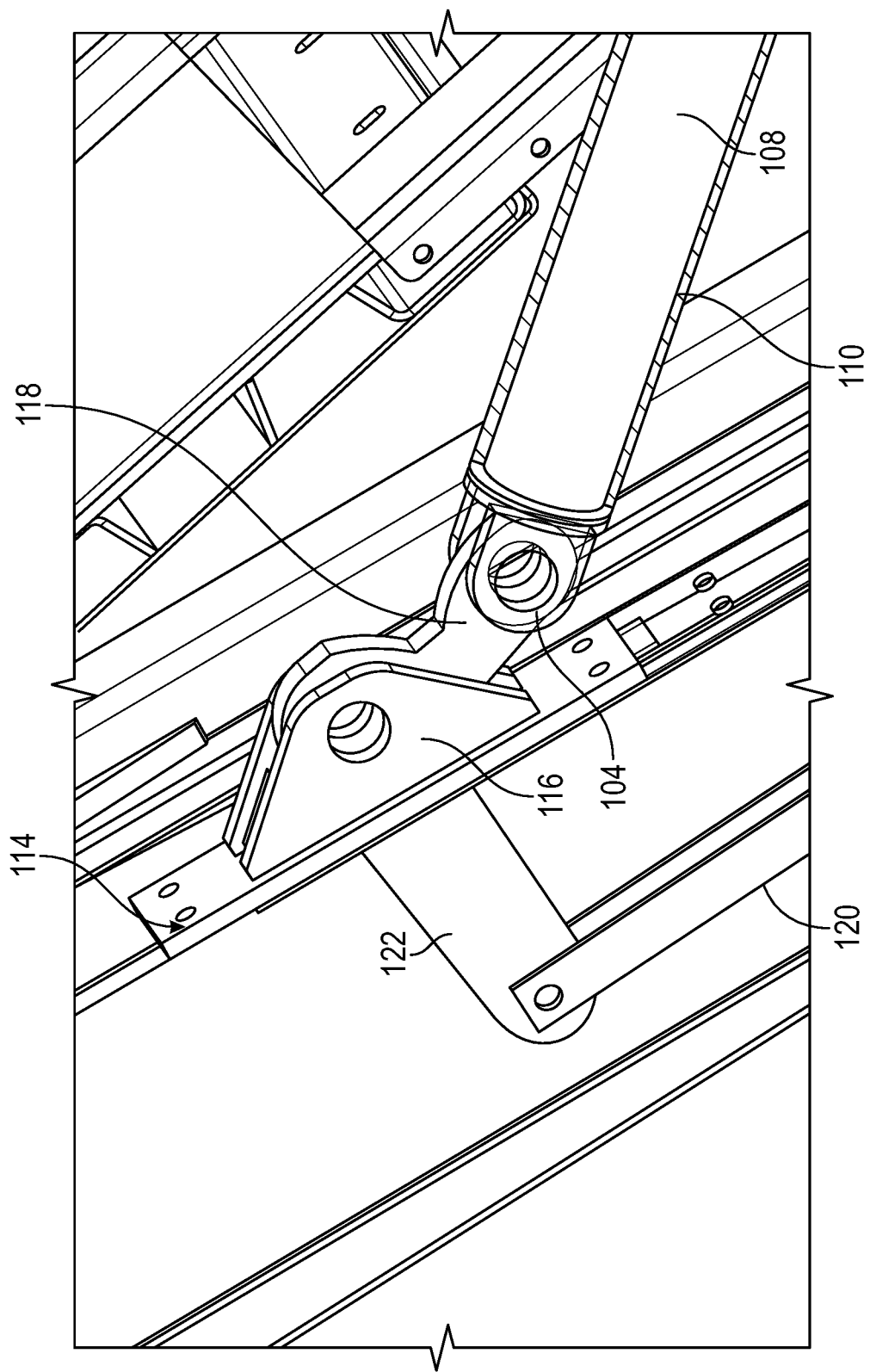
FIG. 15 is a rear perspective view of the tailgate locking assembly of FIG. 13.

As shown in FIG. 13-15, when moving the tailgate 30 from an open position to the closed position, the locking assembly 114 is configured to automatically secure the tailgate 30 to the body 14. Specifically, movement of the tailgate actuator 100 causes the actuator arm 108 to retract fully into the sleeve 110 (as shown in FIGS. 14 and 15). As the actuator arm 108 retracts into the sleeve, and after the tailgate 30 is engaged with the receptacle 16, the sleeve 110 pulls on the pivot plate 118 to rotate about the pivot point and away from the mounting bracket 116. In some embodiments, the pivot plate 118 rotates to an angle within a range between approximately 30° and 75°, inclusive (e.g., 30°, 45°, 60°, 75°, or to any angle between and including the foregoing list of angles), or to another angle depending on the arrangement of the body 14, tailgate 30, and tailgate actuator 100.

In at least one embodiment, rotation of the pivot plate 118 relative to the body 14 and the mounting bracket 116 causes the pivot arm 122 to rotate about the pivot member toward the mounting bracket 116. The rotation of the pivot arm 122 causes the locking arm 120 to slide or otherwise move within the interior cavity (e.g., hollow cavity, etc.) of the receptacle 16 (e.g., the rear pillar, rear post, etc.) between the unlocked position and the locked position. Specifically, as shown in FIG. 13, the locking arm 120 may slide linearly through receiving slot 128 and the slot 136 to thereby lock the tailgate 30 to the body 14.

In some embodiments, the refuse vehicle 10 (e.g., the locking assembly 114) includes a positive lock (e.g., a safety lock, etc.) that is configured to prevent the locking arm 120 from disengaging the tailgate in the event of power loss. For example, the positive lock may from moving from a locked position to an unlocked position if the tailgate actuator 100 loses hydraulic pressure or becomes damaged.

In some embodiments, the tailgate actuator 100 is operated to cause the locking arm 120 to slide within the receptacle 16 between a locked position and an unlocked position without moving the tailgate 30. For example, during opening operations, the tailgate actuator 100 may be operated (e.g., via the processor 102, a hydraulic actuator level, or another suitable actuator) while the tailgate 30 is fully engaged with the body 14 (in a closed position) such that the actuator arm 108 moved to a first extended position in which the pivot plate 118 engages the body 14 (e.g., the receptacle 16, the rear pillar, the rear post, etc.). In some embodiments, the pivot plate 118 rotates towards the mounting bracket until the pivot plate 118 rests on the portion of the mounting bracket 116. Rotation of the pivot plate 118 causes the pivot arm 122 to move upwardly within the interior cavity, drawing the locking arm 120 towards the top of the receptacle 16 and away from the receiving slot 128 and the slot 136. In this way, tailgate latch 130 is decoupled from the coupling mechanism 124 such that the tailgate 30 is released from being secured to the body 14 and is free to move from a closed position to an open position (e.g., to a second extended position of the tailgate actuator 100).

Figure 16:
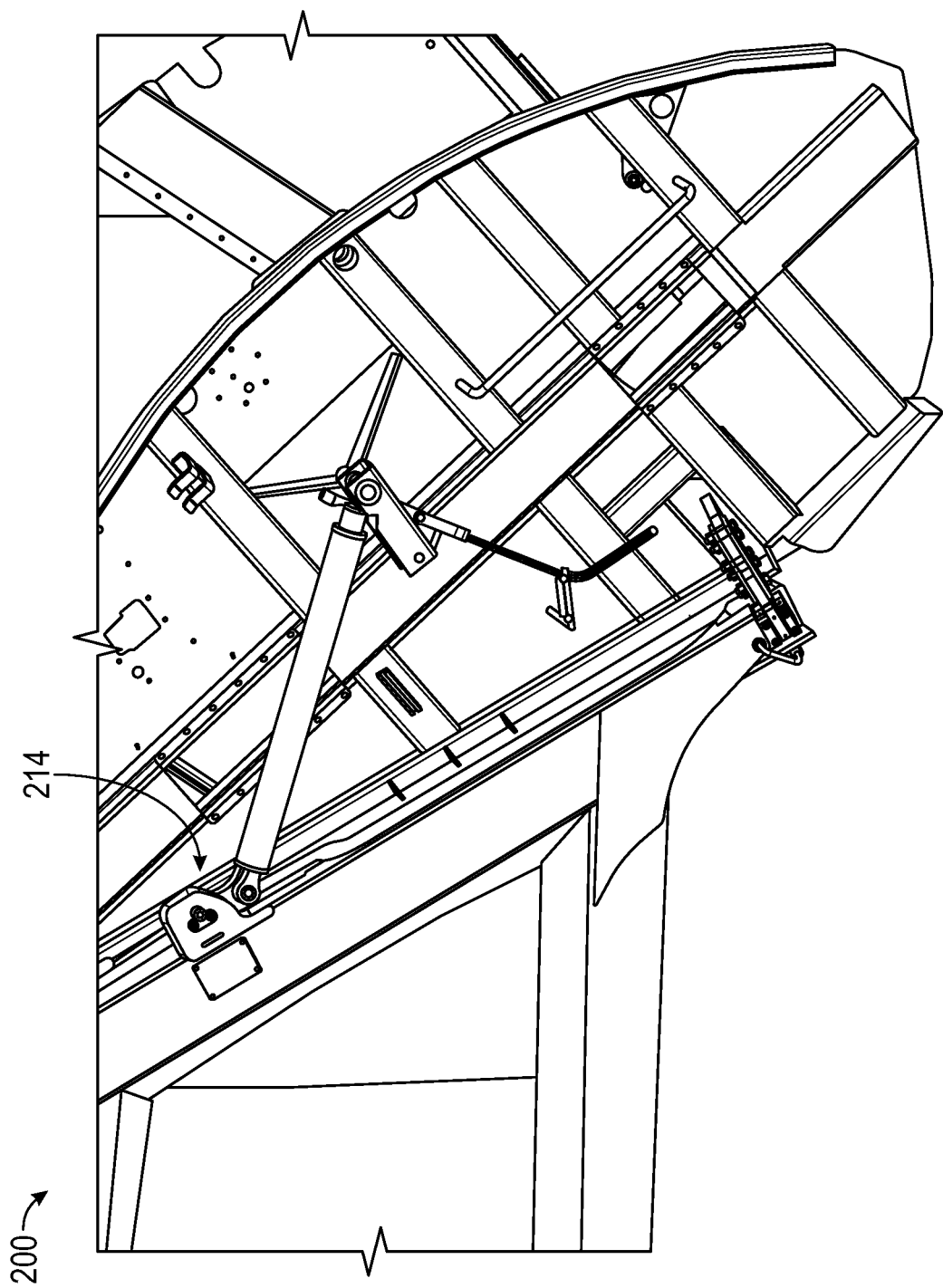
FIG. 16 is a side view of a tailgate locking assembly of a refuse vehicle, according to another embodiment.

Referring now to FIG. 16, another embodiment of a tailgate locking assembly 214 for a refuse vehicle 200 is shown. The locking assembly 214 is arranged in a similar manner as the locking assembly 114 of FIGS. 1-15 but includes additional features to facilitate adjustment of the locking assembly 214 and to prevent self-movement of the lock during loss of power or hydraulic pressure.

Figure 17:
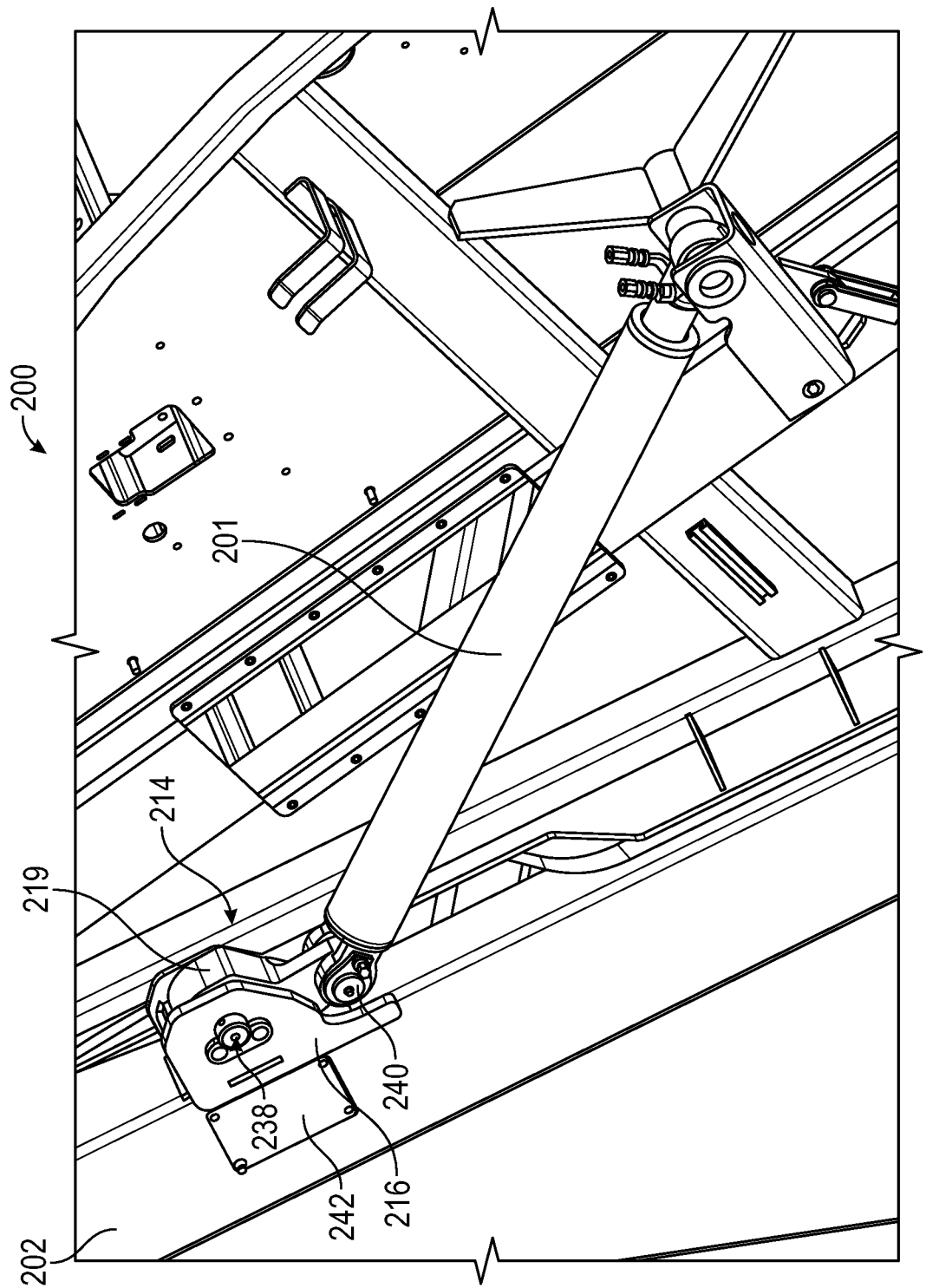
FIG. 17 is a perspective view of the tailgate locking assembly of FIG. 16.
Figure 18:
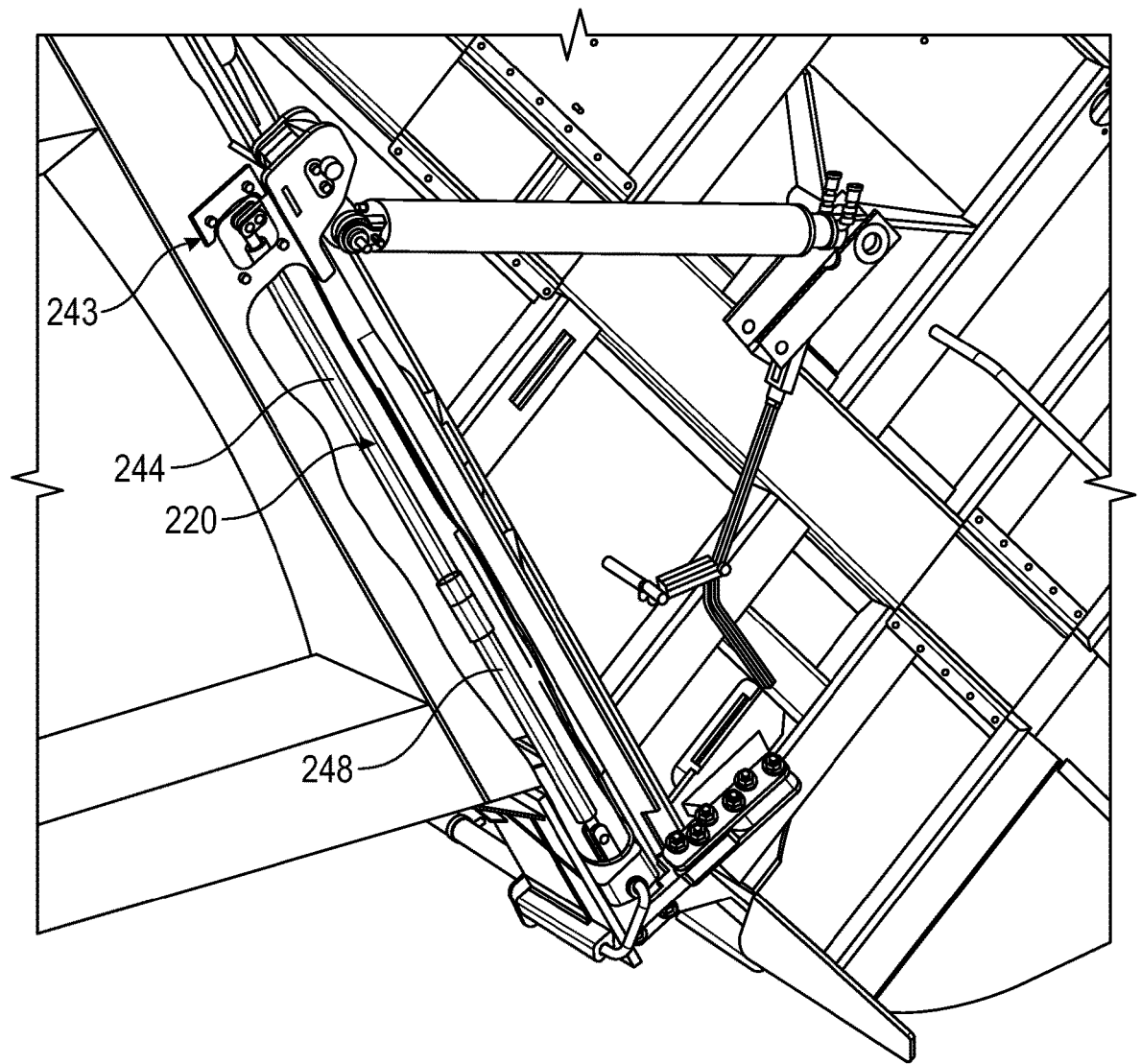
FIG. 18 is another perspective view of the tailgate locking assembly of FIG. 16.

As shown in FIGS. 17-18, the locking assembly 214 includes a first rotatable coupling, shown as bearing assembly 238, that is configured to rotatably couple a pivot member 219 (e.g., cam link that includes both a pivot member and a pivot plate, etc.) of the locking assembly 214 to a mounting bracket 216 on the refuse body 202 (e.g., a support member, a rear pillar, a rear post, etc.). In some embodiments, the mounting bracket 216 may form part of a pillow block for supporting a bearing between the pivot member 219 and the body. The locking assembly 214 may further include a second rotatable coupling, shown as bushing assembly 240, that is configured to rotatably couple a first distal end of the pivot member 219 to a tailgate actuator 201. In some embodiments, the bearing and/or bushing assembly may include fittings (e.g., a grease fitting, etc.) for introducing lubrication to the bearing and/or bushing assembly during service events and to increase the operating life of the locking assembly 214.

Figure 19:
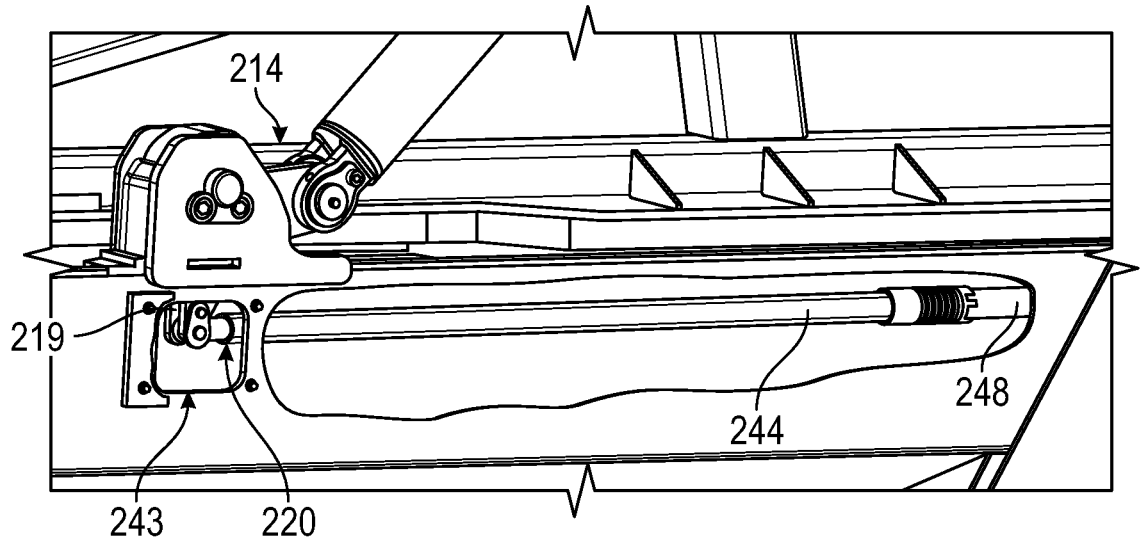
FIG. 19 is a perspective view of the tailgate locking assembly of FIG. 16, shown with an access cover of the tailgate locking assembly removed from a refuse body.

The refuse vehicle 200 may also be configured to facilitate adjustment and/or maintenance of different components of the locking assembly 214 without cutting into or otherwise disassembling the refuse body. For example, as shown in FIG. 17, the refuse vehicle 200 may include at least one access panel 242 along a refuse body (e.g., a support post, a rear pillar, a rear post, etc.) that is configured to enable access to one or more components of the locking assembly 214 as well as to facilitate installation and/or servicing operations. As shown in FIGS. 18-19, the access panel 242 may conceal an opening 243 in the refuse body (e.g., a support post, a rear pillar, a rear post, etc.) that provides access to an interior cavity or enclosure housing a locking arm 220 of the locking assembly 214. As shown in FIGS. 18-19, the opening 243 may be disposed adjacent to a first arm end of the locking arm 220 at which the locking arm 220 is coupled to the pivot member 219 to thereby enable coupling/decoupling of the locking arm 220 to the pivot member 219. Such an arrangement can facilitate replacement of the pivot member 219 in the event the pivot member 219 becomes damaged. In some embodiments, the opening 243 is sized to enable replacement of the locking arm 220 (e.g., the opening 243 is sized so that the locking arm 220 can pass therethrough during installation and/or maintenance operations).

In at least one embodiment, the locking assembly 214 is configured to facilitate adjustment of the locking arm 220 and/or to ensure the locking arm 220 fully engages other components of the locking assembly 214 during actuation (i.e., to ensure that the locking arm 220 fully engages a coupling plate of the tailgate in the locked position). For example, as shown in FIGS. 18-19, the locking arm 220 may include a linkage having multiple shafts (e.g., arms, rods, etc.), shown as first shaft 244 and second shaft 248, that are threadingly engaged so as to allow adjustment of the overall length of the locking arm 220. For example, the first shaft 244 may be a rod that is threaded at a distal end of the rod away from the pivot member 219. The second shaft 248 may include a hollow sleeve that is sized to receive the threaded rod therein so that a length of the locking arm 220 can be modified without removing the locking arm 220 from the vehicle. In other embodiments, the locking arm 220 may include another form of adjustable coupling (e.g., spring button connectors, etc.) to enable modification of a length of the locking arm 220 without replacing the locking arm 220.

Figure 20:
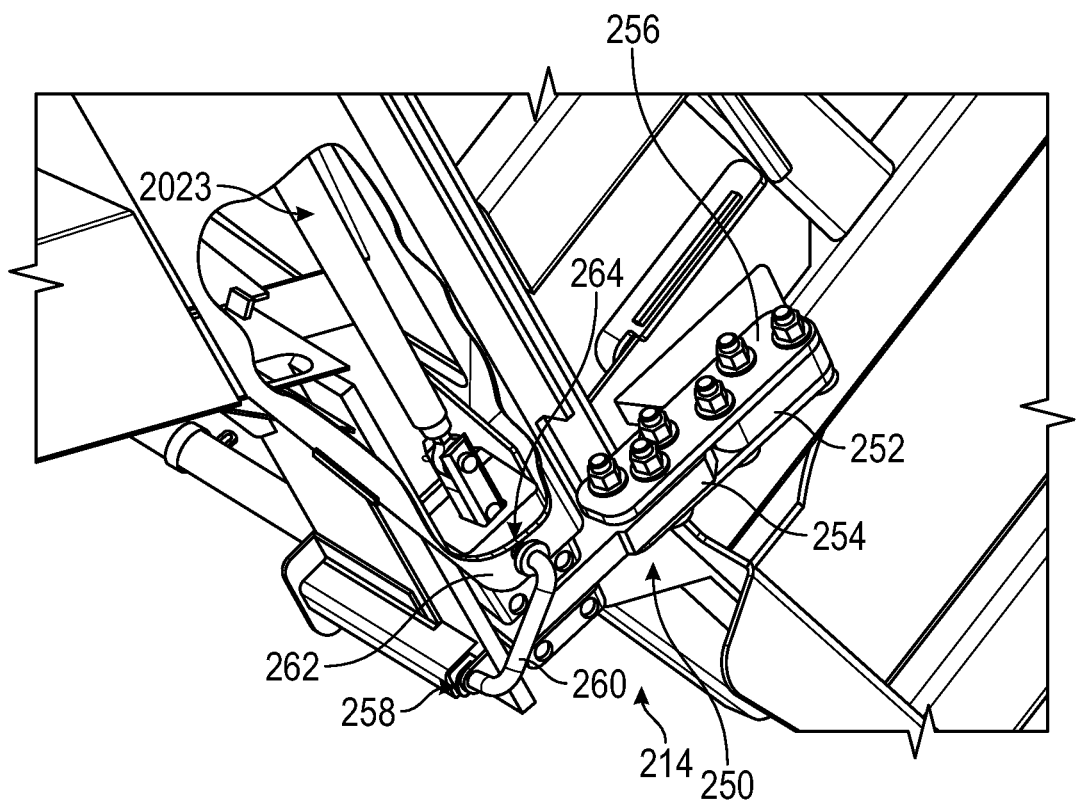
FIG. 20 is a front perspective view of a passive locking mechanism of the locking assembly of FIG. 16.
Figure 21:
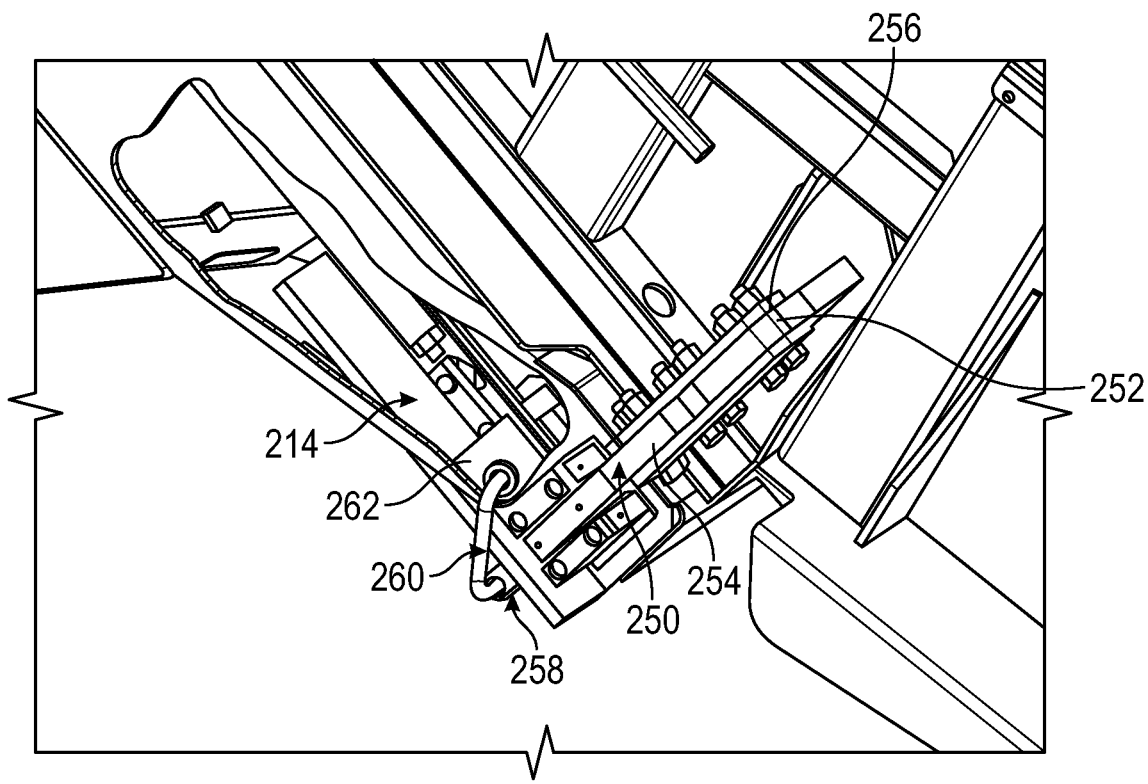
FIG. 21 is a rear perspective view of the passive locking mechanism of FIG. 20.
Figure 22:
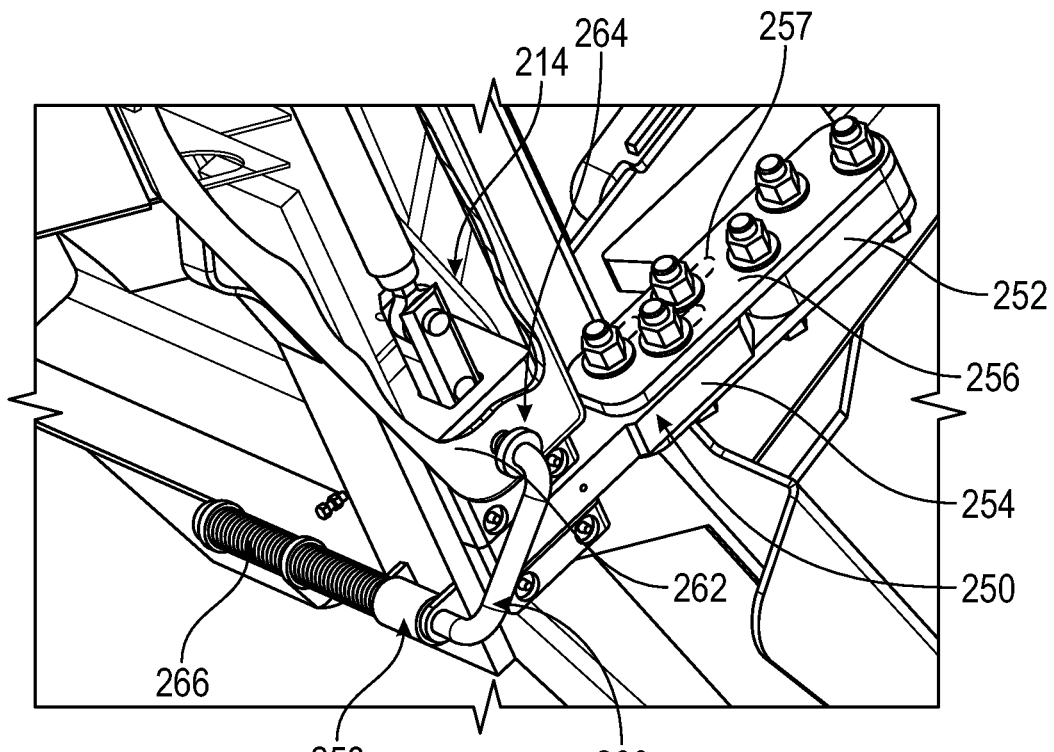
FIG. 22 is a bottom perspective view of the passive locking mechanism of FIG. 20.

Referring to FIGS. 20-22, the locking assembly 214 may further include a coupling plate assembly 250 that is configured to (i) engage with the tailgate, and (ii) allow adjustment of the relative positioning between the coupling plate assembly 250 and a connection mechanism on the refuse body when the tailgate is in the closed position. The coupling plate assembly 250 may include a tailgate mount 252, a support flange 254, and at least one bracket member 256 that couples the support flange 254 to the tailgate mount 252. In at least one embodiment, the coupling plate assembly 250 includes a pair of bracket members 256. The support flange 254 and the tailgate mount 252 may be sandwiched or otherwise disposed between the bracket members 256 and may be coupled to the bracket members 256 via a removable fastener, such as a bolt, pin, rivet, or another type of fastener. At least one of the bracket members 256, the support flange 254, and/or the tailgate mount 252 may include slotted openings 257 to allow adjustment of a length of the coupling plate assembly 250 and to facilitate alignment (e.g., axial alignment, etc.) between an opening or receiver slot in the support flange 254 and the connection mechanism on the refuse body.

The locking assembly 214 may also include safety features to prevent movement of the tailgate in the event of power loss to the tailgate actuator. For example includes a passive lock and/or interface member that is configured to prevent movement of the locking arm 220 in the event of power loss to the tailgate actuator (e.g., loss of electrical power to the tailgate actuator, loss of hydraulic pressure, etc.). For example, as shown in FIGS. 20-22, the locking assembly 214 may include a tailgate locking pin assembly 258 that is configured to engage the locking arm 220 and connection mechanism to thereby prevent movement of the locking arm 220 relative to the connection mechanism when the locking arm 220 is in the locked position. The locking pin assembly 258 may include a locking pin 260 that is moveably coupled to the refuse body (e.g., a rear pillar, a rear post, etc.). The connection mechanism may include a cross member or support flange 262 that is slidably engaged with the locking arm 220 and that is configured to guide the locking arm 220 between a locked and an unlocked position. The support flange 262 may include a transverse opening, shown as cross-hole 264, that extends through the support flange 262 and that is alignable with a corresponding opening in the locking arm 220 when the locking arm 220 is in a locked position to enable engagement between the locking pin 260 and the locking arm 220.

As shown in FIGS. 20-22, the locking pin 260 may be a spring-loaded latch pin that includes U-shaped shaft or rod. A first pin end of the locking pin 260 may include a stud that is configured to engage the support flange 262 and the locking arm 220 when the locking assembly 214 is in a locked position. The locking pin 260 may also include a flange extending radially away from the stud to prevent over-insertion of the locking pin 260 into the support flange 262 and to maintain a gap between an intermediate leg of the locking pin 260 and the refuse body (to provide space for an operator or technician to grasp the intermediate leg of the locking pin 260, and to manipulate a position of the locking pin 260 during unloading operations).

Figure 23:
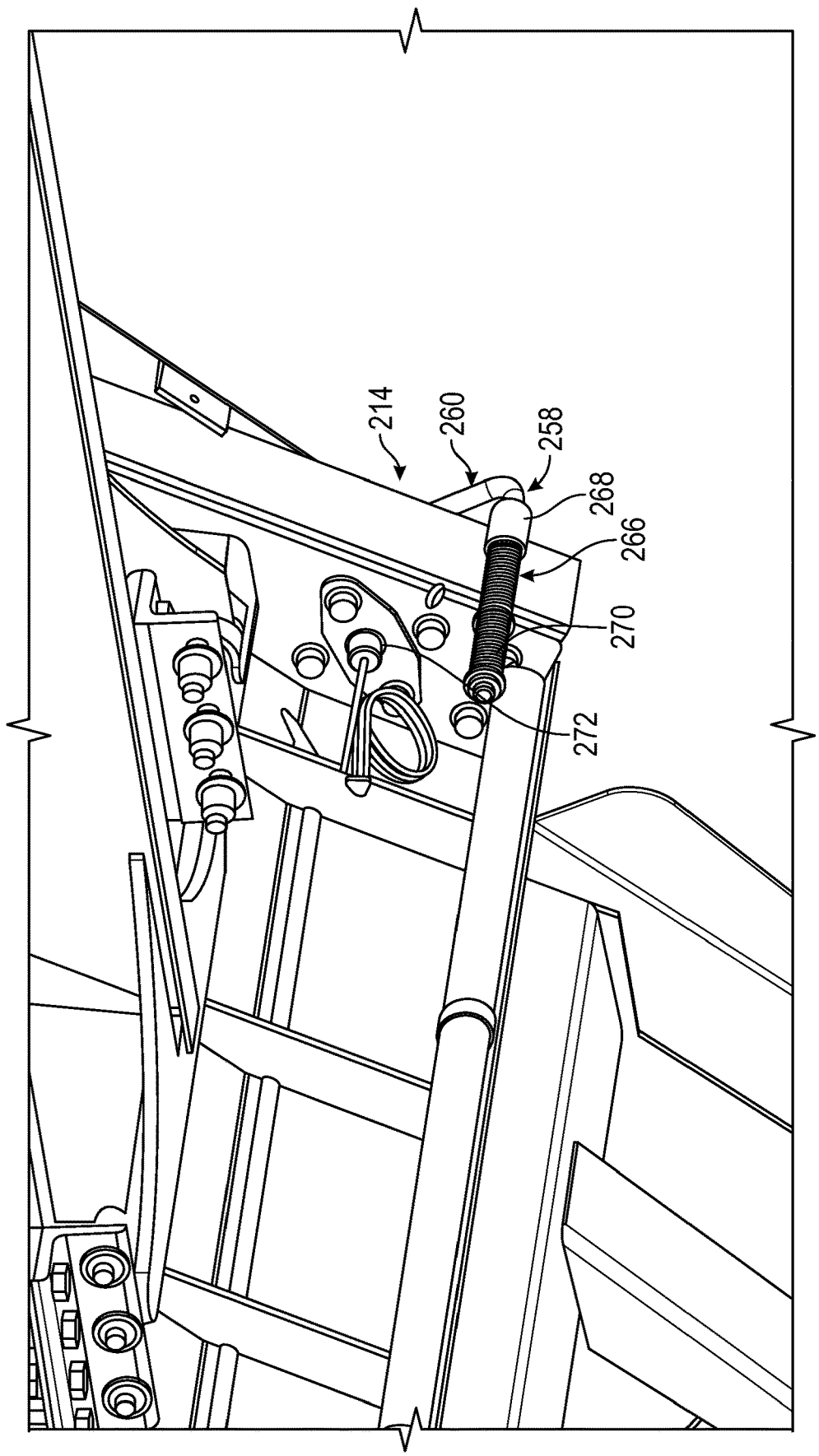
FIG. 23 is another bottom perspective view of the passive locking mechanism of FIG. 20.

As shown in FIG. 22, a second pin end of the locking pin 260 is spaced apart from the first pin end by the intermediate leg of the locking pin 260. The second pin end of the locking pin 260 may be coupled to the refuse body via a spring assembly 266 that is configured to maintain engagement between the locking pin 260 and the locking arm 220 when the locking assembly 214 is an a locked position. As shown in FIG. 23, the locking pin 260 may be coupled to a lower wall of the refuse body (e.g., a rear pillar, a rear post, etc.) by a pin sleeve 268 that secured to the lower wall. In other embodiments, the pin sleeve 268 may be disposed at another location along the refuse body. The second pin end may extend through the pin sleeve 268 and may be configured to allow translation and rotation of the locking pin 260 relative to the refuse body. The locking pin assembly 258 may also include a biasing member 270 (e.g., a spring, etc.) disposed between the second pin end and the pin sleeve 268. Compression of the biasing member 270 between the second pin end and the pin sleeve 268 draws the locking pin 260 inwardly toward the refuse body, and into engagement with the locking arm 220, to thereby prevent inadvertent removal of the locking pin 260 from the locking assembly 214.

In at least one embodiment, the locking assembly 214 is configured to monitor a position of the locking pin 260 and to prevent operation of the tailgate actuator based on the position of the locking pin 260. For example, the locking assembly 214 may include a sensor 272 (e.g., a proximity sensor such as an optical sensor or a capacitive sensor, etc.) that is configured to detect whether the locking pin 260 has been inserted into the support flange 262 and/or locking arm 220. The sensor 272 may be disposed beneath the refuse body, on an opposing end of a support member (e.g., a rear pillar, a rear post, etc.) of the refuse body, and may be disposed proximate to the cross-hole 264 through the support flange 262 (e.g., at an opposite end of the cross-hole 264 as the locking pin 260). The sensor 272 may be communicably coupled to a control system of the refuse vehicle (e.g., a processor of an engine control module or other vehicle control module) and may be configured to transmit an indication of the position of the locking pin 260 to the control system. The control system may be configured to provide an indication of a position of the locking pin 260 to an operator via a user interface, such as in the cab of the refuse vehicle (e.g., via an indicator light, etc.).

In some embodiments, the control system may be configured to selectively prevent operation of the tailgate actuator and/or movement of the refuse vehicle depending on the position of the locking pin 260. For example, the control system may be configured to selectively limit operation of the refuse vehicle based on a position of the passive lock. For example, the control system may be configured to prevent operation of the refuse vehicle in response to an indication that the locking pin 260 has not been inserted into the locking arm 220 after closing the tailgate. The control system may also be configured to prevent operation of the tailgate actuator in response to a determination that the locking pin 260 has been inserted into the support flange 262 (such as when the operator is attempting to close the tailgate and the locking pin 260 would interfere with actuation of the locking arm 220). Such an arrangement improves operator safety and reduces the risk of damage during use.

Among other benefits, the tailgate locking assembly described herein reduces the number of components and the number of the steps necessary to unlock and lock a tailgate in position relative to the refuse vehicle body. Additionally, the tailgate actuator assembly is powered by the same actuator used to open and close the tailgate, thereby reducing the potential for operator error during unloading operations. The tailgate locking assembly is also concealed within an interior cavity of the body, which improves safety and the overall aesthetic of the refuse vehicle.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various processing steps.

Although this description may discuss a specific order of steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various processing steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "lowermost," "uppermost," etc.) are merely used to describe the orientation of various elements in the figures. It should be noted that the orientation of various elements may differ according to other embodiments, and that such variations are intended to be encompassed by the present disclosure.

It is important to note that the construction and arrangement of the refuse vehicle as shown in the embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other embodiments without departing from scope of the present disclosure or from the spirit of the appended claims.

What is claimed is:

1. A refuse vehicle, comprising:
   a chassis;
   a body supported by the chassis and defining a receptacle configured to store refuse therein;
   a tailgate positioned at an end of the receptacle, the tailgate rotatably coupled to the body;
   a tailgate actuator coupled to the tailgate and configured to move the tailgate relative to the body between an open position and a closed position; and
   a tailgate locking assembly coupled to the body and the tailgate actuator, the tailgate locking assembly comprising:
      a pivot plate rotatably coupled to the body, a first end of the pivot plate coupled to the tailgate actuator;
      a pivot arm coupled to the pivot plate at a second end of the pivot plate, the pivot arm extending away from the pivot plate at an angle; and
      a locking arm rotatably coupled to the pivot arm and spaced apart from the pivot plate by the pivot arm, the locking arm configured to engage with a tailgate coupling mechanism of the body to couple the tailgate to the body in response to movement of the tailgate actuator.

2. The refuse vehicle of claim 1, wherein the tailgate locking assembly further comprises a passive lock configured to prevent operation of the tailgate actuator.

3. The refuse vehicle of claim 2, wherein the passive lock comprises a locking pin that is movably coupled to one of the body and the tailgate, the locking pin configured to engage with the tailgate locking assembly to prevent movement of the tailgate locking assembly.

4. The refuse vehicle of claim 2, further comprising:
   a control module; and
   a sensor communicably coupled to the control module and configured to transmit an indication of a position of the passive lock to the control module, the control module configured to selectively limit operation of the refuse vehicle based on the position.

5. The refuse vehicle of claim 1, wherein the locking arm is positioned within an interior cavity of the body, the locking arm movable with respect to the body between a locked position and an unlocked position.

6. The refuse vehicle of claim 5, wherein the body defines an opening proximate to the tailgate locking assembly and providing access to the interior cavity and at least one component of the tailgate locking assembly, the body further comprising an access panel covering the opening.

7. The refuse vehicle of claim 5, wherein the pivot plate rotates in response to movement of the tailgate actuator.

8. The refuse vehicle of claim 5, wherein the tailgate coupling mechanism comprises a slot configured to receive the locking arm when the locking arm is in the locked position.

9. The refuse vehicle of claim 5, further comprising a control module communicably coupled to the tailgate actuator and configured to control actuation of the tailgate actuator to cause movement of the locking arm between the locked position and the unlocked position.

10. The refuse vehicle of claim 5, wherein the locking arm comprises a first shaft and a second shaft that is threadingly engaged to the first shaft so as to allow adjustment to an overall length of the locking arm.

11. The refuse vehicle of claim 1, wherein the tailgate actuator is a hydraulic cylinder that is fluidly coupled to a hydraulic pump onboard the chassis or the body.

12. A tailgate locking assembly, comprising:
    a mounting bracket;
    a pivot plate rotatably coupled to the mounting bracket, a first end of the pivot plate configured to couple to a tailgate actuator for securing a tailgate to a body of a vehicle;
    a pivot arm coupled to the pivot plate at a second end of the pivot plate, the pivot arm extending away from the pivot plate at an angle; and
    a locking arm rotatably coupled to the pivot arm and spaced apart from the pivot plate by the pivot arm, the locking arm configured to engage with a tailgate coupling mechanism of the body to secure the tailgate of the vehicle to the body of the vehicle.

13. The tailgate locking assembly of claim 12, wherein the mounting bracket comprises a trunnion that is configured to rotatably couple the pivot plate to the body.

14. The tailgate locking assembly of claim 12, wherein the pivot arm is integrally formed with the pivot plate as a single monolithic piece.

15. The tailgate locking assembly of claim 12, wherein rotation of the pivot plate causes substantially linear movement of the locking arm.

16. The tailgate locking assembly of claim 12, further comprising the tailgate coupling mechanism, the tailgate coupling mechanism aligned with the locking arm and defining an opening configured to receive the locking arm therein.

17. The tailgate locking assembly of claim 12, further comprising:

a first bearing assembly that rotatably couples the pivot plate to the mounting bracket; and a second bearing assembly disposed at the first end of the pivot plate, the second bearing assembly configured to rotatably couple the pivot plate to the tailgate actuator.

18. The tailgate locking assembly of claim 12, wherein the locking arm comprises a first shaft and a second shaft that is threadingly engaged to the first shaft so as to allow adjustment to an overall length of the locking arm.

19. A method of locking a tailgate to a body of a refuse vehicle, comprising:

controlling a tailgate actuator to move the tailgate to a closed position by engaging an end of the tailgate with the body so as to align a tailgate latch of the tailgate with a coupling mechanism of the body; and automatically actuating a tailgate locking assembly that is movably coupled to the tailgate actuator to couple a portion of the tailgate locking assembly to the coupling mechanism and thereby secure the tailgate latch to the coupling mechanism in response to an indication that the tailgate is in the closed position, by:

actuating a pivot plate that is rotatably coupled to the body and that is coupled to a first end of the tailgate actuator responsive to movement of the tailgate actuator, the actuation of the pivot plate causing movement of a pivot arm that is coupled to at a second end of the pivot plate and extends away from the pivot plate at an angle; and actuating a locking arm that is rotatably coupled to the pivot arm and is spaced away from the pivot plate by the pivot arm responsive to movement of the pivot arm to engage both the tailgate latch and the coupling mechanism.

20. The method of claim 19, wherein wherein actuating the pivot plate comprises rotating the pivot plate in response to movement of the tailgate actuator so as to insert the locking arm into the coupling mechanism.

* * * * *